US008374354B2

(12) United States Patent
Berggren

(10) Patent No.: US 8,374,354 B2
(45) Date of Patent: Feb. 12, 2013

(54) SYSTEM AND METHOD TO PASS A PRIVATE ENCRYPTION KEY

(75) Inventor: David E. Berggren, Arlington, MA (US)

(73) Assignee: Verizon Data Services LLC, Temple Terrace, FL (US)

( * ) Notice: Subject to any disclaimer, the term of this patent is extended or adjusted under 35 U.S.C. 154(b) by 838 days.

(21) Appl. No.: 11/862,847

(22) Filed: Sep. 27, 2007

(65) Prior Publication Data
US 2009/0086977 A1    Apr. 2, 2009

(51) Int. Cl.
*H04L 9/08* (2006.01)
(52) U.S. Cl. ........ 380/279; 380/256; 380/257; 380/282; 380/30; 713/153; 713/155; 713/168; 726/5; 726/26
(58) Field of Classification Search .................. None
See application file for complete search history.

(56) References Cited

U.S. PATENT DOCUMENTS

| 6,516,316 | B1* | 2/2003 | Ramasubramani et al. ......... 1/1 |
| 7,949,871 | B2* | 5/2011 | Randle et al. ................. 713/153 |
| 2003/0099353 | A1* | 5/2003 | Goh et al. ...................... 380/51 |
| 2004/0015725 | A1* | 1/2004 | Boneh et al. .................. 713/201 |
| 2005/0144437 | A1* | 6/2005 | Ransom et al. ................ 713/151 |
| 2006/0015716 | A1* | 1/2006 | Thornton et al. .............. 713/155 |
| 2007/0022469 | A1* | 1/2007 | Cooper et al. ..................... 726/3 |
| 2007/0174472 | A1* | 7/2007 | Kulakowski .................. 709/229 |
| 2008/0072039 | A1* | 3/2008 | Relyea .......................... 713/158 |
| 2008/0201575 | A1* | 8/2008 | van der Rijn ................. 713/156 |
| 2009/0055642 | A1* | 2/2009 | Myers et al. ................... 713/155 |

* cited by examiner

*Primary Examiner* — Shewaye Gelagay

(57) ABSTRACT

A method includes receiving, via a network, a request to provision and provide a private key, the private key being for use with a public and private key system. The method further includes identifying a requester that has made the request via the network and initiating a secure session with the requester. The method also includes providing the private key using the secure session, and provisioning the private key. A system is provided including a distribution location providing access to a network, a terminal selectively connected to the network via the distribution location. The system further includes a network authority selectively connected to the network and the terminal, and a certificate authority selectively connected to the network. The certificate authority is configured to provide and provision a private key, and the network authority is configured to selectively provide a secure session between the terminal and the certificate authority.

23 Claims, 22 Drawing Sheets

SYSTEM AND METHOD TO PASS A PRIVATE ENCRYPTION KEY

BACKGROUND INFORMATION

Public Key Infrastructure (PKI) is a system that uses a public key and a private key to determine, and verify, a user's identity. The PKI also provides for the "binding" of public keys to users (e.g. associating a certain public key to a particular person or entity). The association of a public key to a user is done with a certificate that includes a user's identity and a public key. A certificate may be requested by a user and verified by a third-party that tracks the certificates and whether or not the certificates are valid.

The PKI provides for secure electronic communications between parties. As public networks (e.g. the internet) are not required to have cryptographic interfaces, a user of such a public network cannot be assured that messages are secure from inappropriate interception and review, or even that the intended recipient is in fact the person who receives the message. A common approach to security has been to generate one's own private and public key pairs and to distribute the public key to one's friends. However, this method does not allow an unknown person, or one without the public key, to securely communicate with the user. Such a system is proprietary, not widely accepted, and does not scale well.

Another way to communicate securely is the use of a public key infrastructure. However, these systems require client software, server hardware, and an expensive infrastructure to grant certificates. In use, a validation authority freely distributes public keys, as well as tracks the status of certificates to determine if they are still valid. In this way, users need not maintain their own public/private key infrastructure. When requesting a new public/private key, there is typically a registration authority who physically hands over a disk or a document containing the private key. The registration authority is usually an employee and is tasked with identifying the party requesting the new public/private key and transferring the new public/private key. Thus, a person (e.g. an employee) is in possession of and control over the private key data.

Any security breach in the chain of entities that have had access to private keys deems all private keys handled by that entity as suspect. This is because any entity that has had possession of the new private key could have copied and transferred the private key to an entity other than the rightful requester. For example, when a registration authority is fired, each and every private key handled by that registration authority is now considered invalid because the security breach could have provided an entity, other than the rightful entity, with access to the private key. For the parties that had their private keys distributed by the resident authority, they must now request private keys anew, and spend time and effort to get new private keys. Moreover, the public key infrastructures today having validation authorities are expensive, require significant employee staffing, and present security risks at least due to employees handling of private keys.

Present approaches for private key delivery and public key sharing suffer from a number of shortcomings. At present, public key infrastructure services generally require large numbers of employees to administer the keys. Moreover, these employees each represent a possible security risk. Further, the identification of a user requesting a private key or a certificate must be identified, typically in person, by a registration authority. These registration authorities impose an additional expense and risk in the private key delivery process. Moreover, their identification of the entity they deliver the private key to is prone to error.

Accordingly, it would be advantageous to facilitate direct delivery of certificates and private keys to users. It would further be advantageous to be able to reduce the number of entities in the trust chain in order to reduce the risk of a security breach, reduce distribution costs, and simplify delivery. It would also be advantageous to identify the receiver of a private key by a physical communication channel and to deliver the private key by a known physical communication channel that identifies the user.

DETAILED DESCRIPTION OF THE PREFERRED EMBODIMENTS

Overview

A secure system for private key delivery is disclosed, the private key typically being used with a certificate authority in a private/public key system. Rather than using a typical registration authority, a network authority is used that does not take physical control of a public/private key pair that is newly distributed. Instead, the network authority provides a secure connection directly between a requesting user and a certificate authority. Moreover, due to the "known user" concept (e.g., locating of digital subscriber line ("DSL") and fiber to the premises ("FTTP") connections) the trust chain is enhanced and private key delivery is further secured.

Once a user receives a private key, other users may obtain authentication via a validation authority and a public certificate. Thus, the user may send a communication to a receiver and the receiver may then validate the user's identity by way of the public certificate.

Encryption and Identification System

Figure 1:
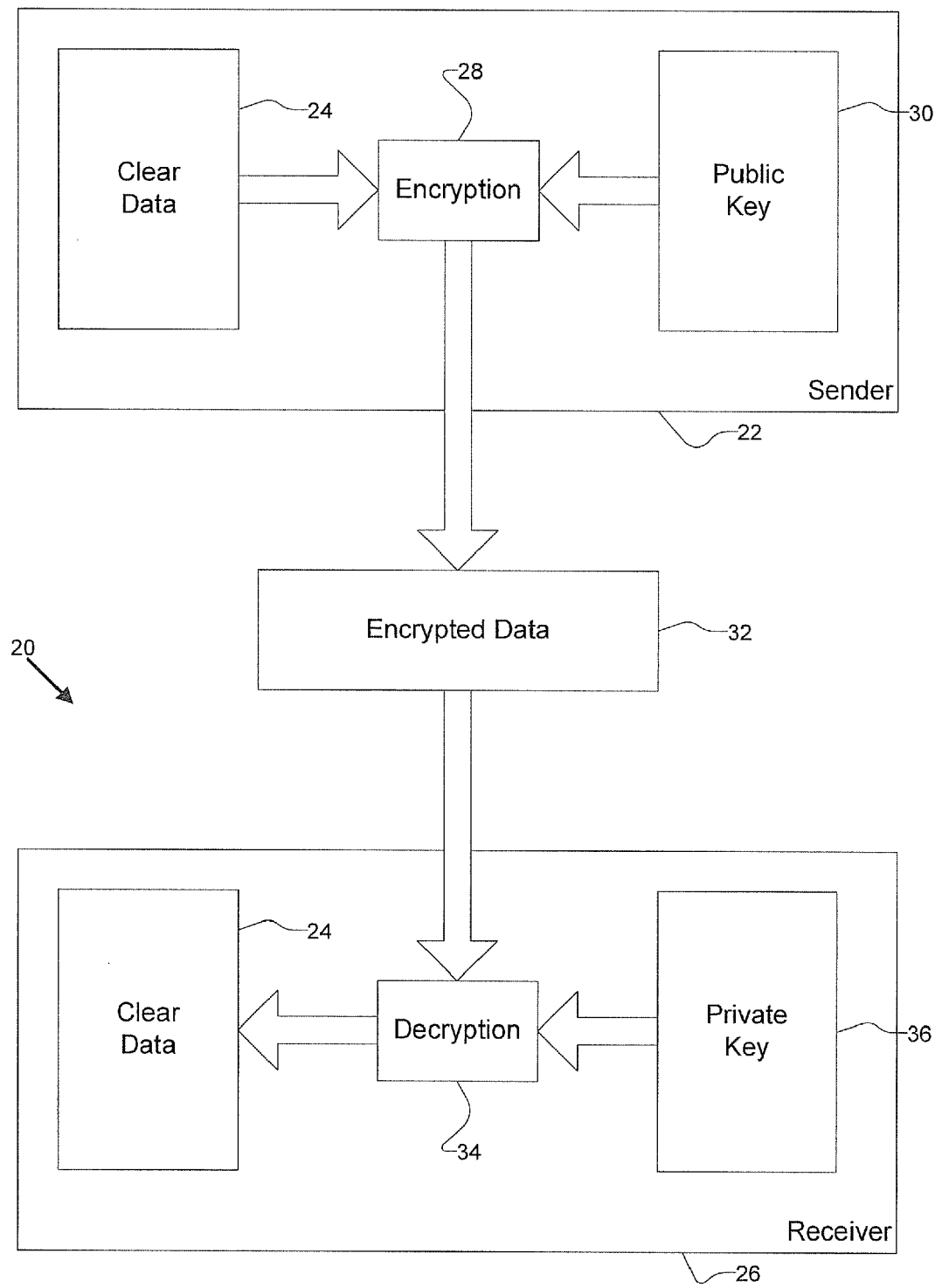
FIG. 1 illustrates a diagram of a private and public key encryption system.

FIG. 1 illustrates a diagram of a private and public key encryption system 20, in accordance with an exemplary embodiment. The public and private key system allows a sender 22 to send clear data 24 to a receiver 26 with the knowledge that if intercepted, no one other than the receiver can view clear data 24. Sender 22 encrypts data 28 using a public key 30 that is accessible to the world. Public key 30 is not secured in any way. Any person may request, receive, and/or store public key 30 without jeopardizing the identification of receiver 26.

In use, public key 30 is used with an encryption algorithm to securely encrypt 28 clear data 24 into encrypted data 32. Clear data 24 may be text, such as an electronic mail message (e-mail), or any other digital information such as a photograph, or simple binary data. Once encrypted 28, encrypted data 32 may be sent on a network 74, such as the Internet, with confidence that only receiver 26 is able to view clear data 24. When received by receiver 26, encrypted data 32 is decrypted 34 using a private key 36 and a decryption algorithm. Receiver 26 may now view clear data 24.

However, where a private key is misappropriated, e.g. stolen or acquired by deception, sender 22 then has misplaced faith in the public and private key system because an entity other than receiver 26 may now view clear data 24. The misappropriation of private key 36 may be, for example, through an attack on a user's PC through a network, a physical theft, or an intercept of the issuance of private key 36 to receiver 26. Moreover, misappropriation may also be accomplished by tricking or misleading the issuer (e.g. a certificate authority, explained in detail below with respect to FIG. 6A) of private key 36 that an imposter is actually receiver 26. In this way, the imposter receives private key 36 as though they were receiver 26.

Figure 2:
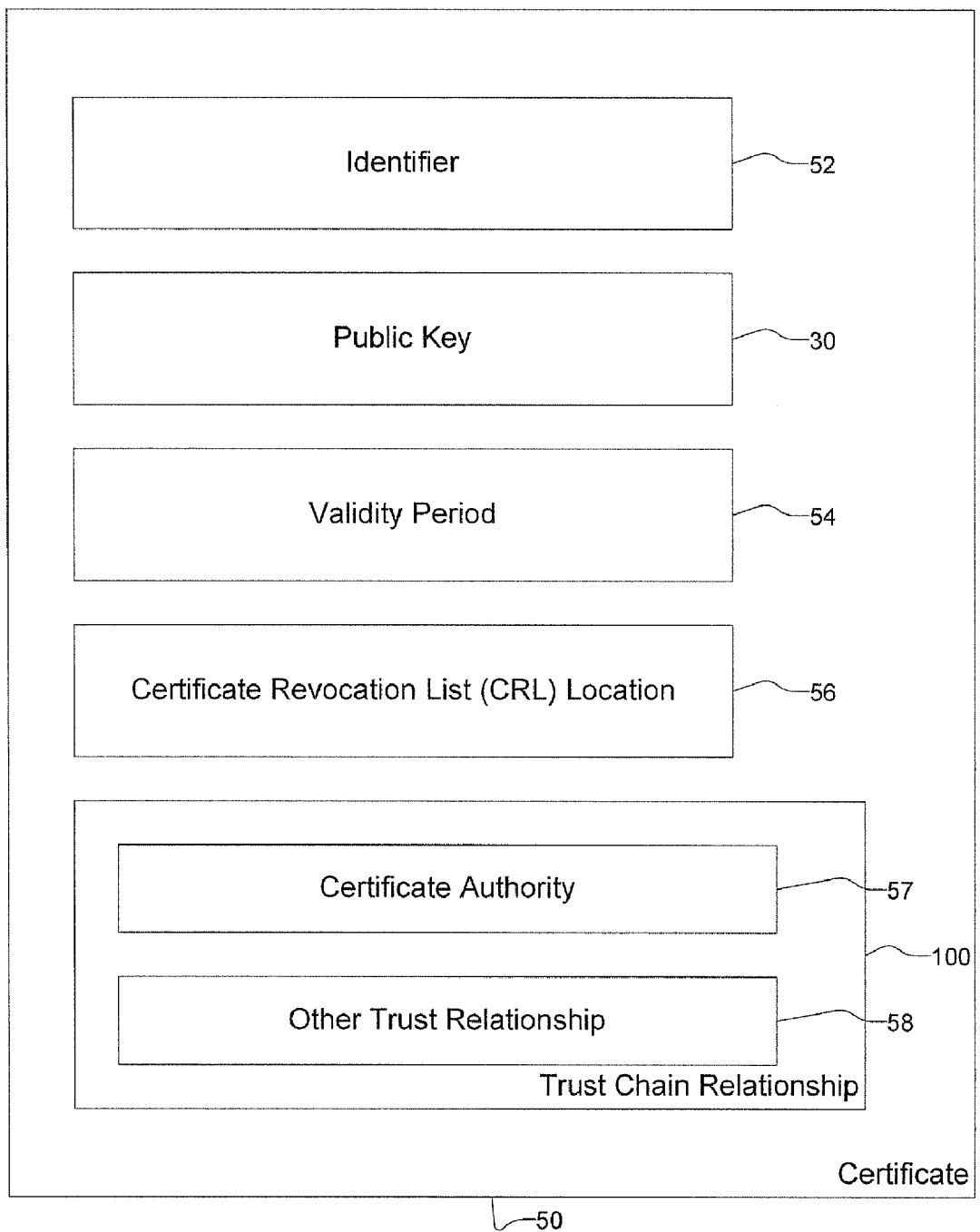
FIG. 2 illustrates a certificate and private key for use with the private and public key encryption system of FIG. 1.

FIG. 2 shows an exemplary certificate 50 used for improving the security and trust so that only receiver 26 is able to decrypt encrypted data 32. Certificate 50 is an example of certificate for use with a public key infrastructure and is not intended to be limiting or show exclusivity to one embodiment of a certificate. More information regarding certificates in public key systems can be found in RFC 2459 ("Internet X.509 Public Key Infrastructure," January 1999). Certificate 50 includes public key 30, an identifier 52, a validity period 54, and a certificate revocation list location 56. Identifier 52 is typically a name of a person, entity, organization, or physical machine. Identifier 52 serves to describe who holds private key 36 (shown in FIG. 1). Although a clear text name, e.g. "John Smith" may be used, other exemplary possibilities include, for example, a generated unique alpha-numerical or binary identifier may be used. Validity period 54 is included as part of certificate 50 to indicate a time period that certificate 50 is valid. Typically, validity period 54 is a calendar date which a sender can reference to determine if certificate 50 has expired. Thus, certificate 50 is only valid for a fixed time period.

Additionally, when used, certificate revocation list location 56 is a location where sender 22 may request a validity status of certificate 50 to determine if certificate 50 has been invalidated for other reasons, e.g. private key 36 has been compromised. Certificate revocation list location 56 is typically a universal resource locator ("URL") for the Internet such that querying the URL with identifier 52 will provide a response indicating a validity status, e.g. valid or revoked. Alternately, certificate revocation list location 56 may indicate a phone number or network address where sender 22 may call to query the status of certificate 50.

In combining all or a subset of public key 30, identifier 52, validity period 54, and certificate revocation list location 56 into a single data structure, sender 22 has the capability to validate certificate 50 in an automated and either a real-time or near real-time fashion such that before a transmission from sender 22 to receiver 26, sender 22 may verify the status of receiver 26. If receiver 26 has a compromised private key 36, then sender 22 aborts transmission of encrypted data 32. Moreover, use of certificate 50 and the capability for verification engenders trust in private and public key encryption system 20.

A trust relationship 100 is also provided as part of exemplary certificate 50 so that parties wishing to use certificate 50 may determine the validity, at least based on the information contained therein. A party may verify that each and every trust relationship 100 is intact. That is to say, before using certificate 50, a check of certificate authority relationship 57, and other trust relationships 58 is possible. When a potential user checks a certificate revocation list 76 and the status of each and every listing in trust relationship 100, they should then have faith and trust that certificate 50 is valid.

Figure 3:
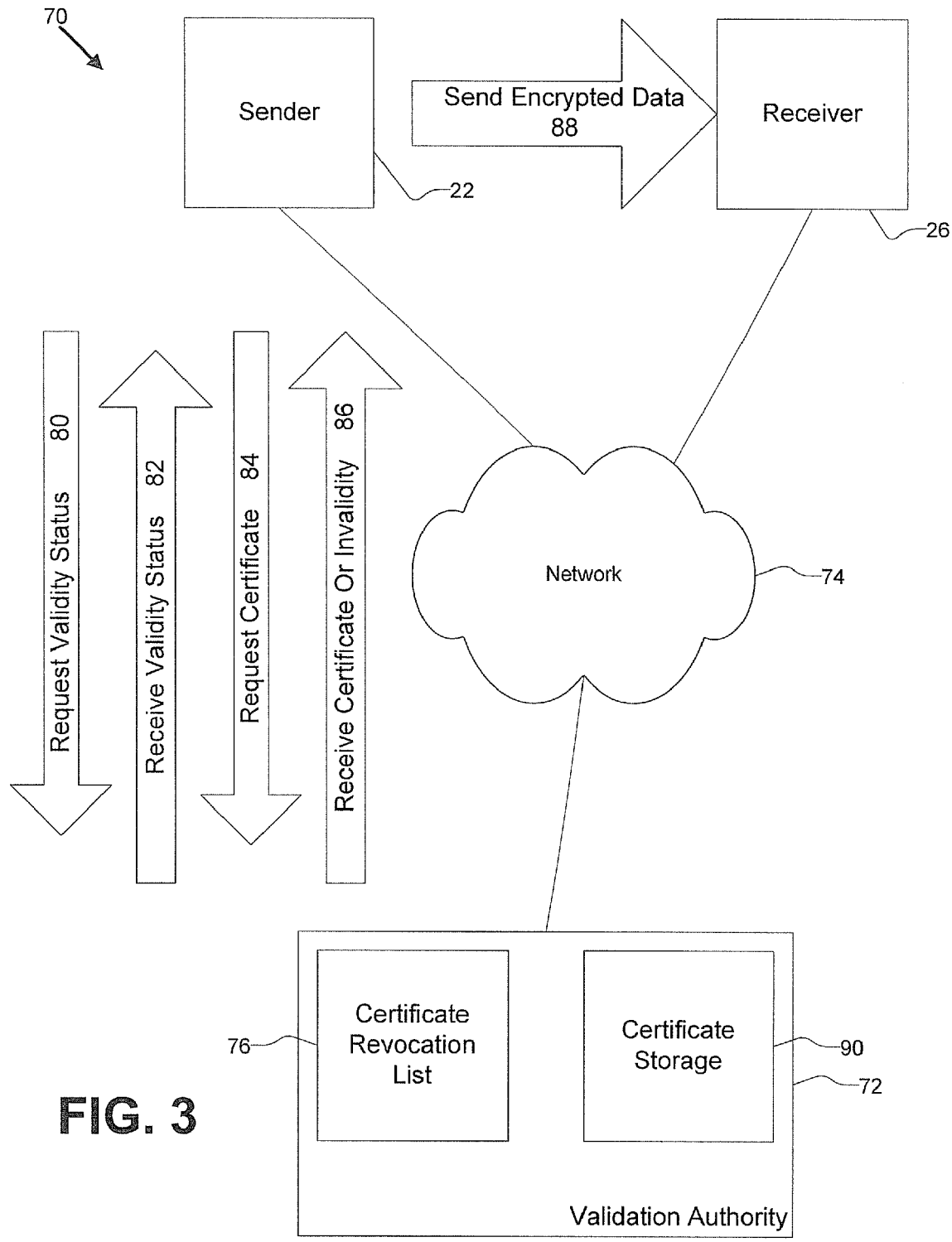
FIG. 3 illustrates a system diagram of a certificate system.

FIG. 3 is a system diagram of a possible certificate system 70. Certificate system 70 includes sender 22, receiver 26, and a validation authority 72, all of which are connected by one or more networks, shown as a single network 74. Network 74 is typically embodied as a public network such as the Internet. Alternatively, certificate system 70 may be connected by a private network or a combination of a public network and a private network, and/or connected by encrypted communications channels using network 74. Validation authority 72 is located on network 74 at one or more locations identified by certificate revocation list location(s) 56 with each location including at least one of certificates 50 and certificate revocation list 76. Validation authority 72 may be embodied on a Lightweight Directory Access Protocol Server ("LDAP Server") and is available for read access by the public. Moreover, a process operating on validation authority 72 operates to coordinate receiving of queries and transmission of responses.

In a first exemplary scenario, sender 22 queries validation authority 72 for a validity status of certificate 50. Sender 22 transmits a validity request 80 to validation authority 72 at certificate revocation list location 56. Validity request 80 includes certificate 50, or at a minimum, identifier 52. Validity request 80 is routed through network 74 and received by validation authority 72. Validation authority 72 then indexes certificate revocation list 76 using identifier 52 and responds to sender 22 by transmitting a status 82 of certificate 50. If certificate 50 is not present in certificate revocation list 76, validation authority responds that certificate 50 is still valid. In an embodiment, validation authority 72 responds only based upon information present or not present in certificate revocation list 76. However, it is envisioned that validation authority 72 may make a request to a third party to further inquire of the status of certificate 50 before responding to sender 22.

In a second exemplary scenario, a sender requests 84 for certificate 50 from validation authority 72 is based on identifier 52. Validation authority 72 will then determine whether certificate 50 is present in a certificate storage 90 as well as whether certificate 50 is still valid. If certificate 50 is found and valid, validation authority 72 responds 86 to sender 22 with certificate 50 as well as an indication that certificate 50 is valid or invalid. If sender 22 is in possession of certificate 50, then only the status of the certificate is requested. If certificate 50 is not found or certificate 50 is invalid, based on certificate revocation list 76, validation authority 72 will respond that certificate is not found or invalid, respectively.

Although validation authority 72 is shown embodied on an LDAP server, it is also envisioned that validation authority 72 may be embodied on a single computing device or multiple devices. Moreover, certificate storage 90 and certificate revocation list 76 may be embodied as files within one or more LDAP servers. Alternatively, certificate storage 90 and certificate revocation list 76 may be records in a database, or databases, such as an Open DataBase Connectivity ("ODBC") database that accepts Structured Query Language ("SQL") requests.

When sender 22 receives certificate 50 or an indication that certificate 50 is valid, sender 22 then encrypts clear data 24 using public key 30 and sends 88 encrypted data 32 to receiver 26. Receiver 26 may then decode encrypted data 32 using private key 36. However, if sender 22 receives an indication that certificate 50 is invalid, sender 22 does not send encrypted data 32 because private key 36 is deemed to be compromised. That is to say, a person or organization other than receiver 26 may possess private key 36 and could then read clear data 24 without permission.

Trust Chain Relationship

Figure 4:
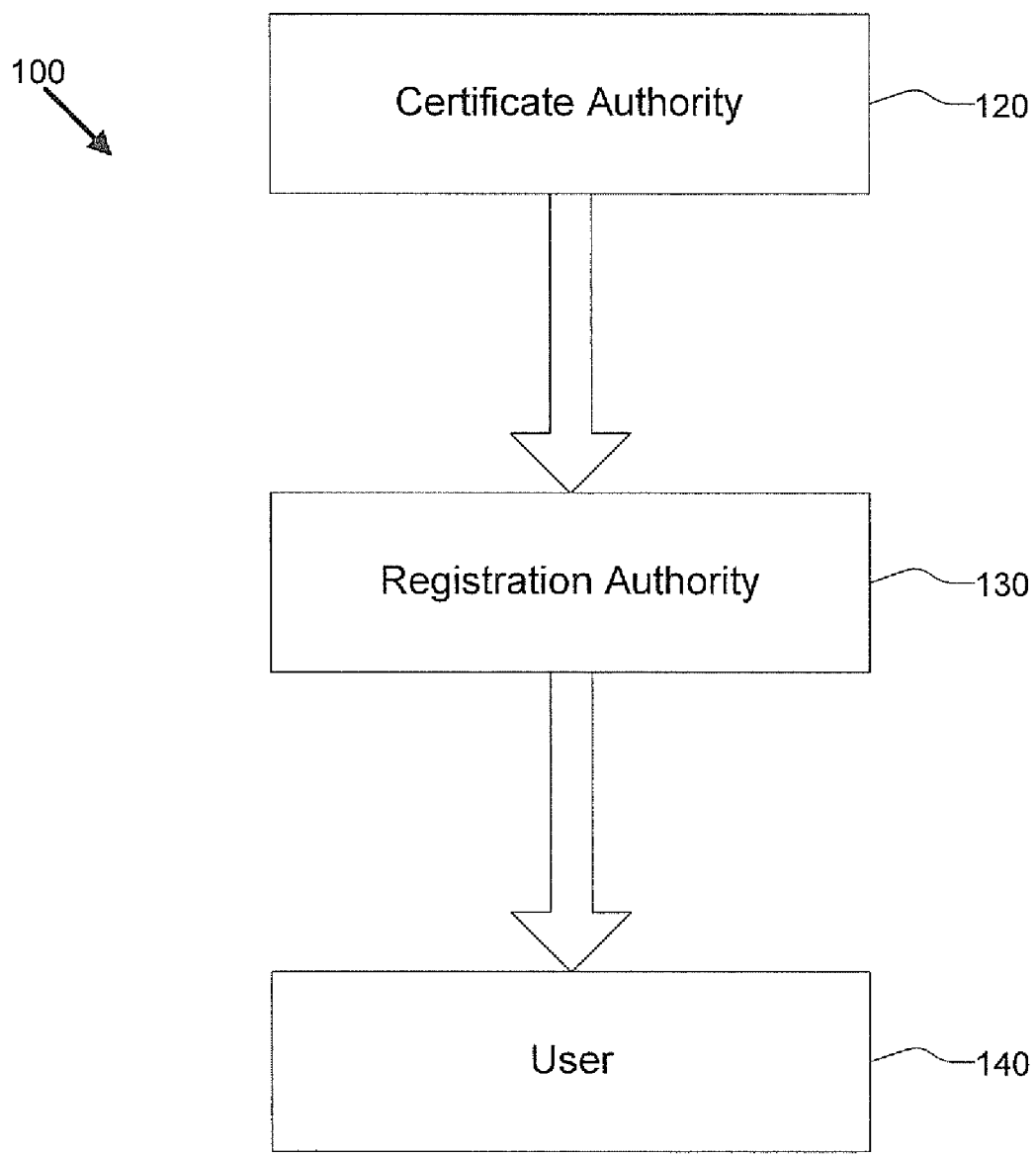
FIG. 4 illustrates a trust chain relationship for the private and public key encryption system of FIG. 1.

FIG. 4 shows a trust relationship 100 between a certificate authority 120, a registration authority 130, and a user 140. Certificate authority 120 initially generates certificate 50 and private key 36 upon the request of a user 140. Certificate 50 is then sent to user 140 via a registration authority 130. Registration authority 130 is charged with verifying the identity of user 140 before certificate 50 and private key 36 are delivered. Registration authority 130 may be a person that checks the identity of user 140. Registration authority 130 may also be a computer system configured to verify the identity of user 140 through an authentication system such as a password, biometric reading, identity verification process or the like, which consists of information that is personal to user 140.

Because registration authority 130 is in possession of private key 36 at some time, registration authority 130 is considered to be in the trust relationship 100 between user 140 and certificate authority 120. Moreover, certificate authority 120 itself is in the trust relationship 100, as well as user 140 because they all have at least temporarily possessed certificate 50. In any event, registration authority 130 had at one time been in possession of private key 36, at least temporarily, as a distributor of certificates for certificate authority 120. Thus, the security and trust of registration authority 130 is paramount. A compromise in the trustworthiness of registration authority 130 would undermine private key 36 because only user 140 is to have access to private key 36. In one scenario, where the trust relationship 100 is compromised, a sender's 22 trust is misplaced that only user 140 has had access to private key 36. Because, for example where registration authority 130 has had security compromised, private key 36 may be known to a person other than user 140.

Trust relationship 100 is developed and tracked such that sender 22 may inquire as to the status of each and every entity that has possessed private key 36. In an embodiment, trust relationship 100 is listed as a part of certificate 50. In another embodiment, trust relationship 100 is stored by validation authority 72. When validation authority 72 is queried as to the status of a certificate, validation authority 72 will determine the trust status of each and every entity listed in trust relationship 100. An exhaustive check is required because a security breach for any entity listed in trust relationship 100 shows that private key 36 may have been acquired by a party other than user 140. Moreover, user 140 may further invalidate certificate 50 in case of a theft or a loss of exclusive control of private key 36.

Figure 5:
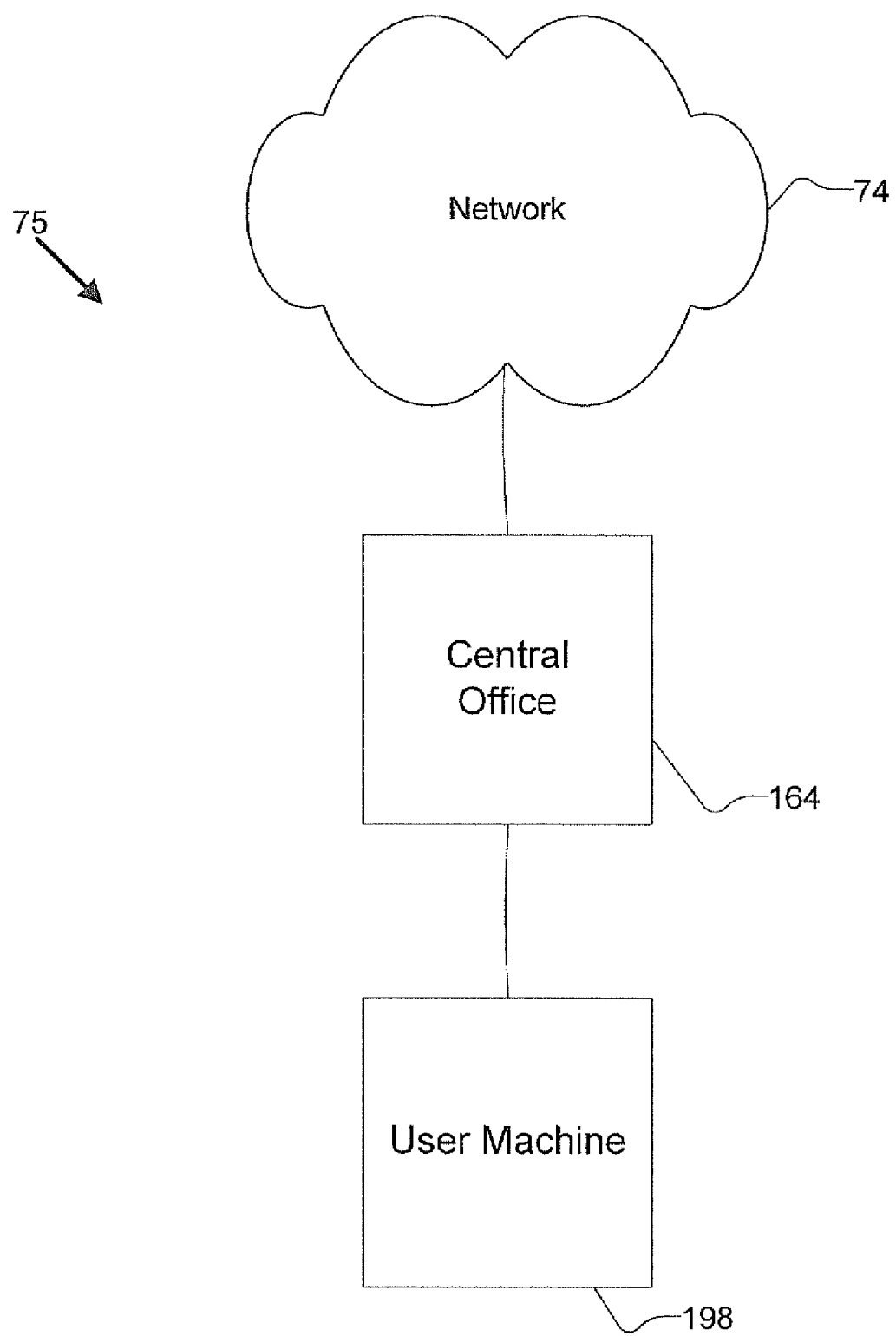
FIG. 5 illustrates a system diagram of a networking service provider.

FIG. 5 illustrates a system diagram of a networking service provider 75 including a network 74, a central office 164, and a user machine 198. In general, networking service provider 75 bridges user machine 198 to network 74. Central office 164 is a location where equipment is located that enables the network connection between user machine 198 and network 74, as described below in detail with respect to FIG. 6A.

Figure 6A:
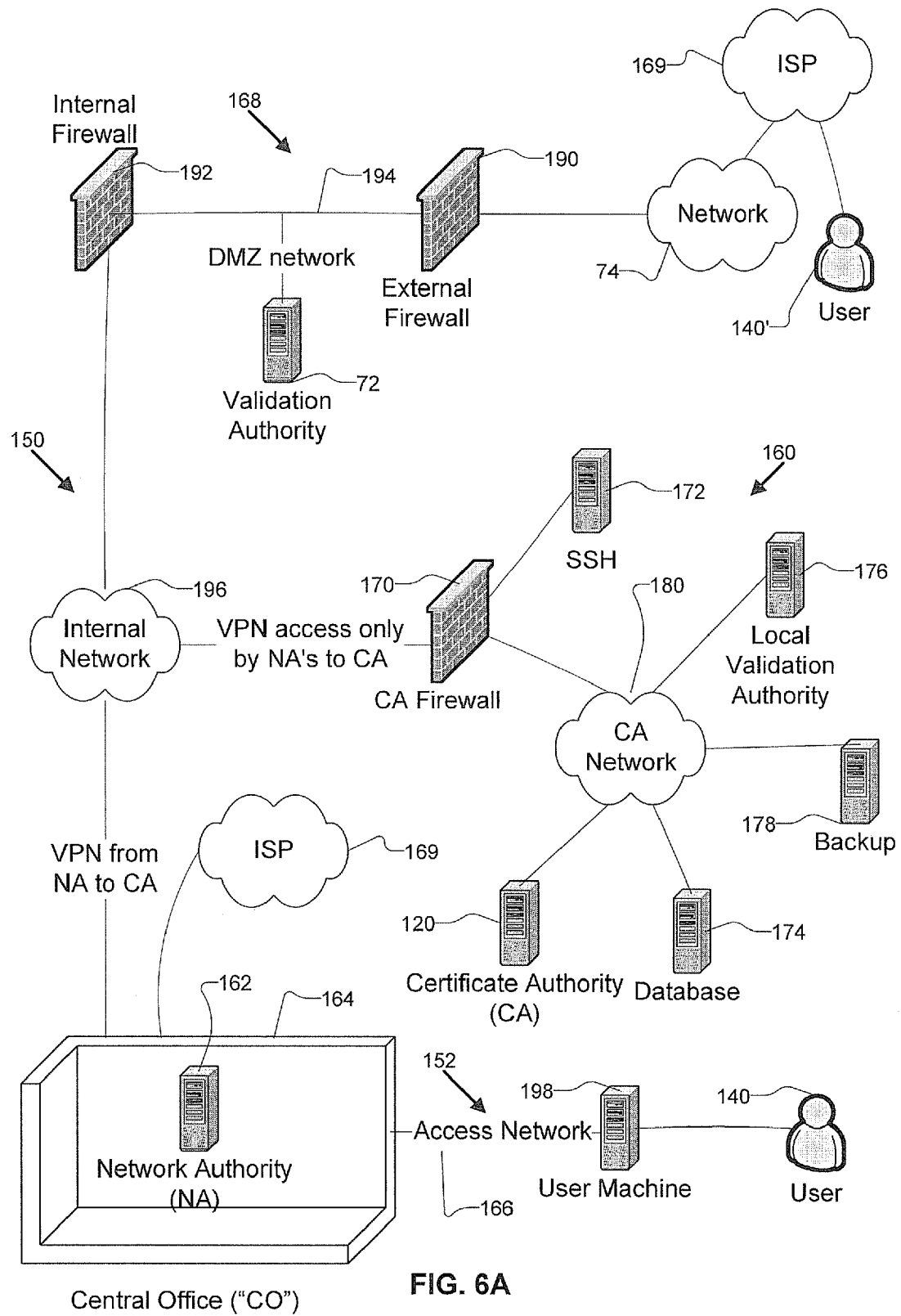
FIG. 6A illustrates a system diagram of a delivery system for obtaining a certificate and a private key for use with the private and public key encryption system of FIG. 1.

FIG. 6A is a system diagram of a delivery system 150 for sending a new certificate 50 and new private key 36 using a known connection 152 to user 140. Delivery system 150 includes a certificate authority system 160, a network authority 162, central office 164, an access network connection 166, and a user 140. To complete the system, a network 74 and a validation authority system 168 are included, but are not necessary to the operation of delivery system 150. Certificate authority system 160 is charged with validating user 140 and securely distributing certificate 50 and private key 36 to user 140, and only user 140. The security in the delivery of private key 36 is central to the initial trust relationship 100, as is explained above in detail with respect to FIG. 4.

Certificate Authority System

Certificate authority ("CA") system 160 includes a certificate authority 120, a certificate authority firewall 170, a secure shell ("SSH") 172, one or more databases 174, a local validation authority 176, a possible backup system 178, and a certificate authority network 180. One or more of the indicated components may take place on one or more pieces of hardware and corresponding software modules. In general, certificate authority network 180 connects the components of certificate authority system 160 behind certificate authority firewall 170. Certificate authority network 180 is thus a private and secure network that allows certificate authority 120, secure shell 172, database(s) 174, local validation authority 176, and backup system 178 to communicate.

In an exemplary embodiment, certificate authority 120 has the overall responsibility of verifying the identity of user 140 and generating a new certificate 50 and a new private key 36. In order to perform these functions, certificate authority 120 interacts primarily with database(s) 174 to draw upon data for identifying user 140 and appropriately generating new certificate 50. Moreover, once generated, new certificate 50 is stored in local validation authority 176 and is ready for public use once published to validation authority 72.

In an alternative embodiment, responsibility for verifying the identity of user 140 may be performed by an enrollment entity (not shown) outside certificate authority network 180. In this case, once the identity of user 140 is established, the enrollment entity may then securely connect to secure shell 172 and provision user 140 as a valid requester of new certificate 50 and a new private key 36.

In generating new certificate 50 and private key 36, certificate authority 120 does not store or otherwise persist private key 36. Once generated, private key 36 is sent to user 140 and thereupon destroyed. Private key 36 cannot be regenerated and is not further stored within delivery system 150. The only copy of private key 36 is with user 140 upon delivery. This mechanism ensures that only user 140 has a copy of private key 36, which is a cornerstone of delivery system 150 and private and public key encryption system 20. As explained below in detail with respect to FIGS. 15-16, 18, and 20, certificate authority 120 verifies the identity of user 140, generates new private key 36, generates new certificate 50 (including the trust relationship 100 established by delivery system 150), and sends new certificate 50 and private key 36 to user 140.

Certificate authority firewall 170 ("CA Firewall") is a network firewall charged with protecting certificate authority system 160, and in particular, maintaining only secure connections for validated users to access certificate authority network 180. CA Firewall 170 is a network layer firewall that protects CA network 180 from unauthorized access. As explained in detail below with respect to FIG. 18, CA Firewall 170 only provides for authenticated virtual private network ("VPN") connections to pass through. As discussed herein, VPNs are considered to be secure encrypted protocols that allow for communications free of eavesdropping (e.g., snooping) and authentication of the connected parties through identification processes. In addition to traditional VPN systems, the secure connection may be embodied as IP Security ("IPSEC"), Secure Socket Layer ("SSL"), Point-to-Point Tunneling Protocol ("PPTP"), Layer 2 Tunneling Protocol ("L2TP"), or other similarly secure routing protocols. Additionally, secure shell 172 operates in conjunction with CA Firewall 170 in order to provide service functions.

Secure shell 172 an exemplary interface used by network authority 162 for initiating communications with CA system 160, as explained below in detail. The remote secure shell 172 interface provides administrators with the ability to monitor, diagnose problems, correct problems, or configure systems. The remote nature of secure shell 172 allows the actions to take place remotely, e.g. without having to physically be present at the location of the hardware. At the same time, secure shell 172 provides security for the remote connection. Secure shell 172 includes client and server connections authenticated by a digital certificate. Moreover, password exchange is encrypted to prevent a security compromise. In this way, an administrator is allowed to gain access to a system remotely and securely. In the case of an administrator, full access is granted to secure shell 172. Network authority 162 will have limited access only to log a status of network authority 162 to database(s) 174.

Database(s) 174 contains records in database schema 220 (see FIG. 7A) that include information used by certificate authority 120, local validation authority 176, and secure shell 172. In general, database(s) 174 maintains information for identification, validation, and recordation of new public keys. Database(s) 174 is provided in one exemplary embodiment as an Open Database Connectivity ("ODBC") configured to interface components of CA network 180 using structured query language ("SQL"). The use of SQL or the like allows for not only storage of information in database schema 220, but also provides for retrieval and manipulation of database schema 220, among other actions.

Figure 7A:
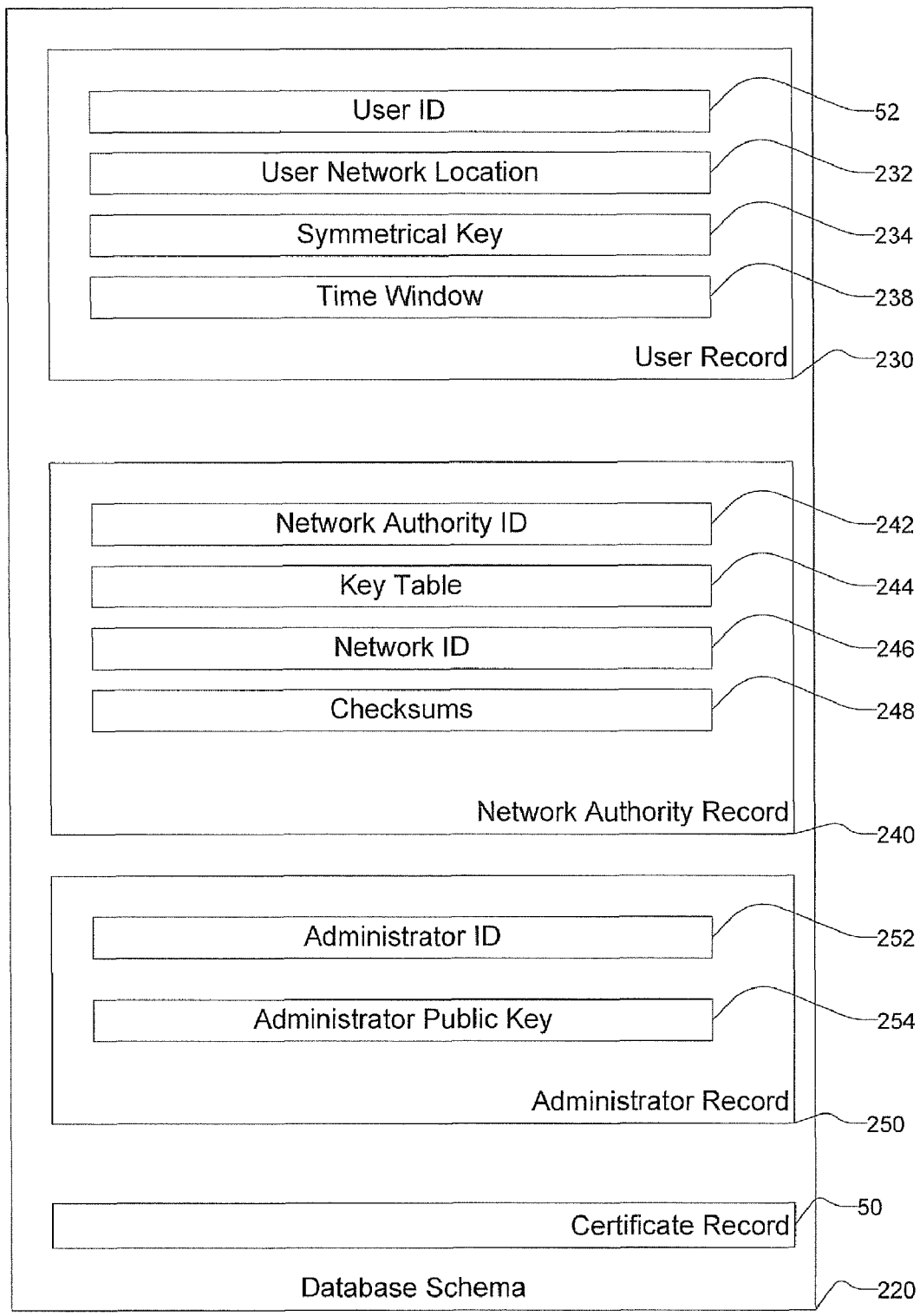
FIG. 7A illustrates database records for use with the system of FIG. 6A.

As shown in FIG. 7A, database(s) 174 contains user records 230, network authority records 240, certificate records 50, and administrator records 250. Information contained in user record 230 includes a user identifier 52, a network location 232, a temporary symmetrical key 234, and a time window 238. Each user 140 awaiting new certificate 50 and new private key 36 has a record stored on database(s) 174. Until completion of new certificate 50 and new private key 36 transfers, database(s) 174 will persist user record 230. Time window 238 stores the date and times (e.g., Monday from the times of 2:00 pm and 3:00 pm) when user 140 may claim new certificate 50 and new private key 36. The elements and uses of user record 230 are explained in detail below with respect to FIG. 16.

Network authority records 240 include a network authority identifier 242, a key table 244, a network location 232, and validation checksums 248. Network authority identifier 242 serves as a unique identifier for a network authority 162. Thus, in multiple network authority records 240, a SQL query can be performed to locate and provide a particular network authority record 240 associated with a unique network authority identifier 242. Key table 244 serves to provide verifying information when network authority 162 attempts to create a connection with certificate authority 120. Network location 232 is an assigned network identifier 52 for further verifying the identity of network authority 162, e.g. a connection from a network authority 162 must come from the associated network or subnet described by network identifier 52. Validation checksums 248 are used to determine whether the software resident at network authority 162 has been tampered with. An authentication (e.g., a challenge password) is a final authenticating mechanism for identifying network authority 162 when contact is initiated with certificate authority 120. Network authority records 240 are explained below in detail with respect to FIG. 7B and FIG. 18.

Figure 7B:
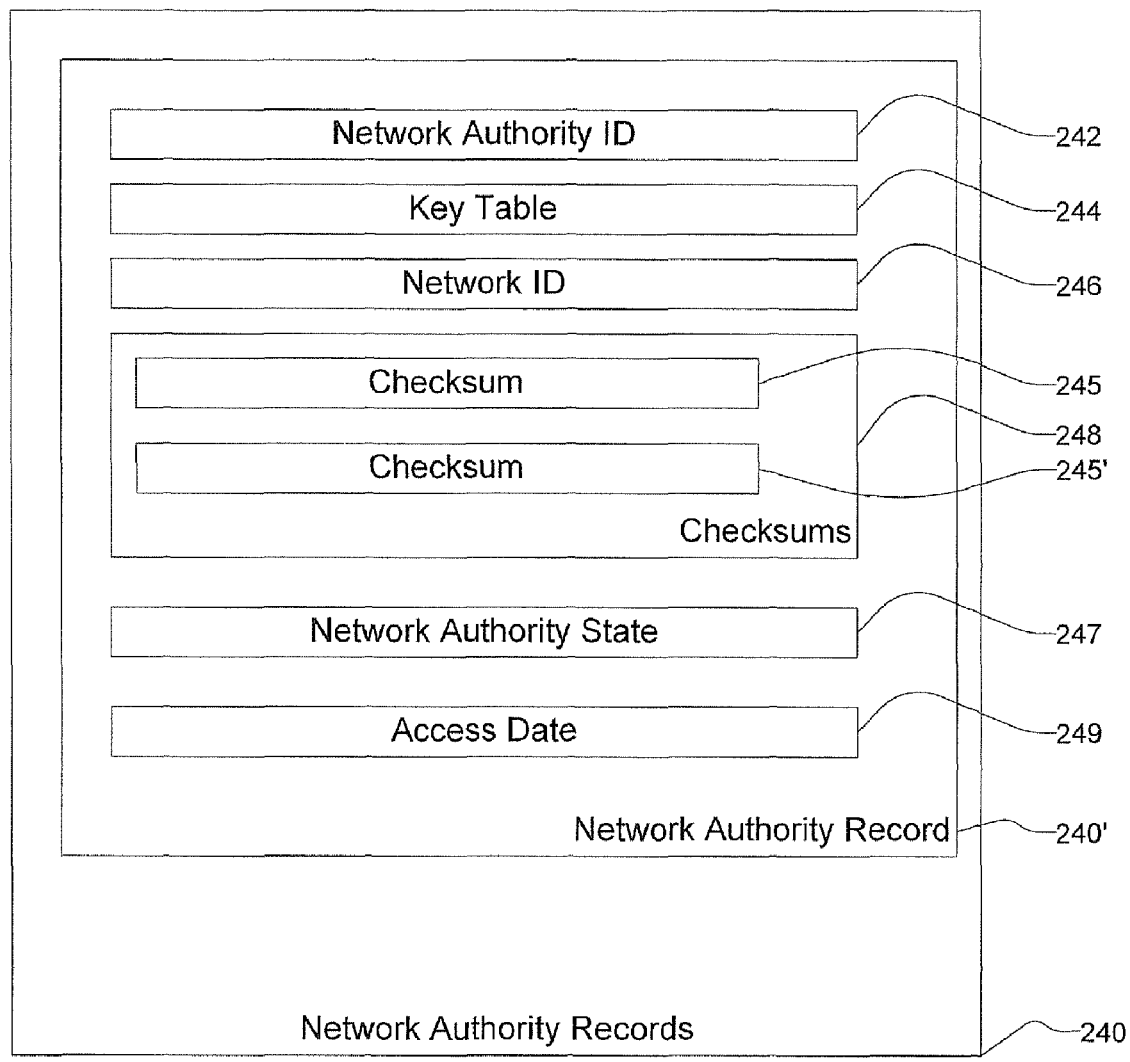
FIG. 7B illustrates network authority records of FIG. 7A.

FIG. 7B described network authority records 240 in greater detail. As shown in network authority record 240', additional information such as network ID 246, checksums 245, 245' (a subset of checksums 248 of FIG. 7A), a network authority state 247, and an access date 249 are included. Network ID 246 is determined by routing information (e.g., IP routing) of the request made by network authority 162 to access secure shell 172 (explained in detail below with respect to FIG. 18). Network ID 246 is used to further identify and authenticate network authority 162. If, for example, a rogue network authority 162 were attempting to initiate a secure session with certificate authority network 180 from an incorrect location (e.g., an unauthorized network or subnet for this particular network authority 162), Secure shell 172 is able to determine the location from the packet routing information and prevent access to certificate authority network 180, as well as a de-authorization of network authority 162.

Checksums 245, 245' are used to further validate software 740 (explained below in detail with respect to FIG. 13). For each piece of software necessary to the operation of network authority 162, a checksum exists to be verified against checksums provided by network authority 162 when a connection attempt is made. If software 740 has been modified, checksums 245, 245' will not match the stored values and access to certificate network 180 will be prevented, as well as a de-authorization of network authority 162. In this way, a rogue network authority 162 that contains modified software, possibly for intercepting communications between user 140 and certificate authority network 180, is prevented from operation.

Network authority state 247 is logged in network authority record 240 to indicate the operational state of network authority 162 and is used by network authority firewall 170 grant VPN access Network authority state 247 may in an exemplary embodiment include "network authority request validation," "access granted," "state active," and "network authority invalid." State "network authority request validation" is used to indicate that network authority 162 has contacted secure shell 172 and is attempting to access network authority network 180. State "access granted" indicates that network authority 162 has provided the correct login information to secure shell 172 and will be granted access when network authority 162 requests a VPN through network authority firewall 170. "State active" indicates that VPN access has been established and network authority 162 may actively connect user 140 with certificate authority network 180. State "network authority invalid" indicates that a problem was encountered when network authority 162 attempted validation through secure shell 172 and network authority 162 is further prevented access through certificate authority firewall 170. In an exemplary embodiment where "network authority invalid" is logged, an administrator must determine the cause of the failure and manually remove the state "network authority invalid" before the offending network authority 162 is again allowed to attempt a connection. Depending upon the cause of the failure to establish a connection (e.g., checksum 245, 245' mismatch due to software 740 tampering), network authority 162 may be deemed a security risk and permanently banned from reconnection.

Administrator records 250 include an administrator identifier 252 ("administrator ID"), and an administrator public key 254. Administrator ID 252 uniquely identifies a particular administrator attempting to access certificate authority 120. Administrator public key 254 is a public key that allows secure shell 172 to verify the identity of an administrator (explained in detail above). Additionally, an administrator authentication (e.g., challenge password) must be entered by an administrator attempting to gain access to certificate authority 120 as a security measure.

In the exemplary embodiment discussed above more broadly with respect to FIG. 2, certificate record 50 includes user identifier 52, public key 30, trust relationship 100, and a validity period 54. Certificate records 50 are generated by certificate authority 120 after a new certificate 50 and private key 36 have been delivered to user 140. User identifier 52 is a unique identifier assigned to user 140 that particularly identifies them. User identifier 52 is an alpha-numeric string and may include a sub-structure having the text name of user 140, e.g. "John Smith." Public key 30 is the public key assigned to user 140 and is available through validation authority 72 to the public, e.g. un-trusted requesters. Trust relationship 100 includes parties that have held private key 36 in certificate system 70, as explained in detail above with respect to FIG. 4. Thus, when an un-trusted party queries validation authority 72 to verify the status of certificate 50, each and every entity listed in trust relationship 100 will be checked for a security breach.

If security is faulty with any of the entities listed in trust relationship 100, certificate 50 is invalidated. A validity indicator shows the validity status of certificate 50 and contains a code for "valid" and "invalid." When certificate 50 is initially generated by certificate authority 120, invalidity indicator is set to "valid." At any time during the life of certificate 50, invalidity indicator is set to "invalid" when there is a security breach in trust relationship 100 or a request from user 140 to invalidate certificate 50. Certificate records 50 are explained below in detail with respect to FIG. 20.

Moving now back to FIG. 6A, local validation authority 176 is used to publish certificates 50 and certificate revocation lists 76. Local validation authority 176 is configured as an LDAP. Files stored at local validation authority 176 serve as a reference for updating outside validation authority 72. Because local validation authority 176 is secured by CA Firewall 170, the security of local validation authority 176 is enhanced. Therefore, local validation authority 176 serves to store new certificates 50 and certificate revocation list 76 for publishing to validation authority 72. Moreover, for security purposes, local validation authority 176 is provided with a one-way connection out of CA Firewall 170 to perform publishing tasks.

Backup system 178 is optional and is designed to provide timely copies of all information on CA system 160 in case of equipment failure or other disaster situations. However, at no time does backup system 178 possess or save to backup new private key 36, or any private keys 36. Backup system 178 may be embodied as a single computer system saving data to backup media, or may be embodied as multiple devices operating to provide redundancy. In this way, multiple backup systems 178 may be used to mirror data storage in case of equipment failure in one backup system 178 that may corrupt the backup data. The backup media may be hard-disk based, magnetic tape, or other media. The process of "backing up" CA system 160 may include a full backup, an incremental backup, and a differential backup as. Moreover, backup media may be securely placed in fireproof safes for improved disaster recovery. If equipment failure were to occur within the components of CA system 160, administrators may then use the most recent back up data to restore CA system 160 to the last known backup point. Although it is possible to lose data between a backup point and a failure, backup system 178 is designed to backup in near real-time as CA system 160 has data changes. Thus, data loss is minimized.

As described above, certificate authority 120, certificate authority firewall 170, secure shell 172, database(s) 174, local validation authority 176, backup system 178, and certificate authority network 180 are embodied as separate computing machines. However, the elements of CA system 160 may be aggregated, or separated, in numerous configurations to combine or separate functionality. In one example, secure shell 172 and CA Firewall 170 are combined into a system. In another example, certificate authority 120, database(s) 174, and local validation authority 176 are combined into a system. However, CA system 160 is simplified where each distinct element is embodied on a separate device and may be maintained individually with minimal, if any, downtime.

Public Network

Network 74 is a network core layer and is a network that is open to any communications, typically the Internet, e.g. the world-wide-web, but may be embodied as a public network, private network, or any combination thereof. In other embodiments, network 74 could be a local area network (LAN), wide area network (WAN), or any other kind of telecommunications or computer network. An external firewall 190 protects validation authority system 168 and internal network 196 from attack and unauthorized intrusion.

Internal Network

Internal network 74 is a network core layer and is a network that is private in nature to the provider services for the network distribution layer. In an exemplary embodiment, internal network 74 connects central office with certificate authority network 180, as well as connecting certificate authority network 180 with DMZ network 194. In alternative embodiments, internal network 196 may connect user 140 to network 74. In an exemplary embodiment, internal network is provided as a fiber-optic network, but could be embodied as a local area network (LAN), wide area network (WAN), or any other kind of telecommunications or computer network.

Validation Authority System

Validation authority system 168 includes validation authority 72, an external firewall 190, an internal firewall 192, and a Demilitarized Zone Network 194 ("DMZ network"). Validation authority 72 is similar to local validation authority 176 of CA system 160, although validation authority 72 does not have the ability to publish stored records. In operation, validation authority 72 takes requests from users of network 74 for certificates 50 including public key 30. In an example, a user of network 74 may ask for the public certificate of known user 140 so that a message may be encoded to user 140. Moreover, users of network 74 may request a determination as to the validity of certificate 50.

When requested for certificate 50, including public key 30, validation authority 72 receives the request to include user identifier 52, which may be an alpha-numeric value, binary, or other suitable identifier. Given user identifier 52, validation authority 72 sends certificate 50 to the requester if certificate 50 is available. In this way, validation authority 72 becomes a repository of multiple certificates 50 for multiple users 140.

Validation authority 72 is also used to verify the status of certificate 50, e.g. valid or invalid. When requested to verify status, validation authority 72 will look up the status of a certificate in certificate revocation list 76. Validation authority 72 may perform the lookup of certificate revocation list 76 provided certificates 50 or user identifier 52 as query terms. Validation authority 72 would then respond as to the validity of certificate 50.

Moreover, although the function of distributing certificates 50 may be discontinuous, the maintenance of certificate revocation list 76 must be always available to user 140, as well as users requesting a status from network 74. If validation authority 72 is not available, the authenticity and validity of certificate 50 cannot be verified. A lack of availability would result in a diminishing of the trust of certificate system 70.

External firewall 190 protects validation authority 72, DMZ network 194, and internal network 196 from undesirable attack and intrusion. External firewall 190 only allows requests from network 74 to connect with validation authority 72. Moreover, internal firewall 192 prevents requests from DMZ network 194 entering internal network 196. Thus, network 74 traffic can never enter internal network 196. In this way, DMZ network 194 is isolated. In essence, DMZ network 194 operates between internal network 196 and network 74. External firewall 190 and DMZ network 194 allow validation authority 72 to be accessed from network 74 without allowing access to internal network 196 or CA network 180. In this way, validation authority 72 may safely and securely offer information and services (e.g., CA distribution and CRL lookup) to public users without sacrificing security to internal network 196 and CA network 180.

Internal firewall 192 includes a pass-through from CA network 180 to DMZ network 194 with network traffic only allowed from CA network 180 to DMZ network 194. Thus, the network channel is a one-way system from CA network 180 to validation authority system 168. Such a configuration allows local validation authority 176 to publish new certificates 50 and updates to certificate revocation list 76 without reducing the overall security of CA network 180, even if only during update periods. Moreover, because the information contained at validation authority 72 is for public distribution, no encryption is necessary for the published data transfer between local validation authority 176 and validation authority 72. However, in order to update validation authority 72, the identity of the publisher (e.g., local validation authority 176) from CA network 180 must be determined to avoid attempts at fraudulent publication.

Central Office

Central office 164 is a data carrier location generally housing switching and related equipment necessary to connect internal network 196 to access network connection 166. As explained below in detail, central office 164 may be used in a digital subscriber line ("DSL") embodiment, a fiber to the premises ("FTTP") embodiment, or a "headend" cable-type embodiment (e.g. coaxial cable capable of carrying digital and/or video signals). Central office 164 may be a structure (e.g. building), data center, or closet-type implementation (e.g. a small room in a larger structure or an underground station). The type of equipment housed at central office 164 is dependent upon the embodiment deployed for access network connection 166. However, central office 164 is not limited to a single embodiment for access network connection 166. That is to say, central office 164 typically contains equipment enabling multiple types of connections for services available from a provider. Central office 164 bridges the network distribution layers (discussed below in detail) with the network core layer of internal network 196 and network 74. Moreover, central office 164 connects user 140 to an internet service provider ("ISP") 169, or the like.

Access Network Connection

Access network connection 166 is the network connection between central office 164 and user machine 198 and is considered part of the network distribution layer. Generally, any embodiment for access network connection 166 is allowed. Trust relationship 100 of delivery system 150 is enhanced where the entire network connectivity, including access network connection 166, is secure. Thus, embodiments allowing for a secure physical connection are preferred.

Access network connection 166 is preferred to provide identification of user machine 198 by means of establishing a physical connection from central office 164. This can be established by way of a dedicated channel, e.g. a fiber, from central office 164 to user machine 198. In other embodiments, an interface at user machine 198 may be configured to only receive data packets having a unique identifier. Moreover, any data packets sent from user machine 198 to central office 164 may be specially coded to identify user 140 by way of assignment (e.g. the interface is coded with information specific to user 140). Where more than one user 140 shares access network connection 166, encryption may be designed into the system at a hardware level or a software level.

Figure 8:
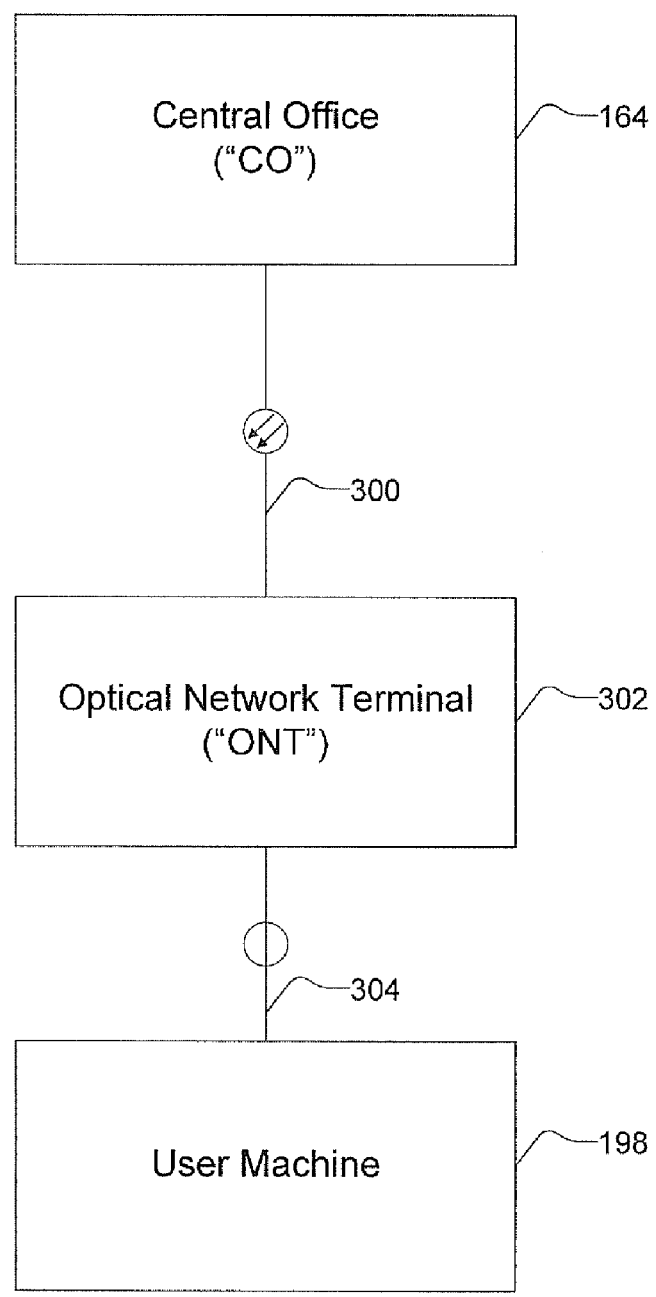
FIG. 8 illustrates an access network connection using a dedicated fiber use with the system of FIG. 6A.

Turning now to FIG. 8, an embodiment of access network connection 166 uses a dedicated fiber 300. Central office 164 is connected to an optical network terminal ("ONT") 302 by dedicated fiber 300, which in turn is connected to user machine 198. User machine 198 connects to optical network terminal 302 by a standard local network connection 304 (e.g. Ethernet and wireless). ONT 302, sometimes called an optical network unit ("ONU"), is an interface between the optical network of dedicated fiber 300 and a home, business, or general location. Generally ONT 302 interfaces an optical system to a wired system (e.g., copper-wire based Ethernet). Using dedicated fiber 300, the identification of user 140 is determined with a high degree of confidence. This is because there are no other users 140 connecting to dedicated fiber 300. Thus, only user 140 is connected to central office 164 when dedicated fiber 300 is in use.

If a rogue user were to attempt to snoop on dedicated fiber 300, an optical splitter would be required to detect network traffic on dedicated fiber 300. The installation of an optical splitter would require breaking the connection of central office 164 to ONT 302 during the installation of an optical splitter to a snooping fiber. Because central office 164 monitors the performance of dedicated fiber 300, central office 164 would immediately become aware of the failure of dedicated fiber 300 and an investigation as to the fault would result in locating an underperforming section of dedicated fiber 300.

As described above, the identification of user 140 is highly confident when using dedicated fiber 300. Identification of user 140 is performed using a number of methods, Dedicated fiber 300 connects to equipment at central office 164 and is assigned a particular address. Thus, the physical connection of dedicated fiber 300 is known and the address is then assigned to user 140. Moreover, ONT 302 includes a unique identifier that can be read by the equipment at central office 164. Therefore, the terminus of dedicated fiber 300 is known to be ONT 302 and also ONT 302 has the assigned unique identifier of user 140.

Because dedicated fiber 300 is not shared in any way, the identification of user 140 is determined with high confidence. Moreover, the risk of interception of private key 36 when sent is minimal because snooping would be detected at central office 164. Thus, using dedicated fiber 300 maximizes the trust relationship 100, described above in detail with respect to FIG. 4, when delivering private key 36. The delivery of private key 36 is known to be sent to user 140, rather than an imposter, and private key 36 is delivered without digital eavesdropping. The identification of user 140 is placed in the system at user record 230 in database schema 200. User identifier 52 is filled with user's 140 corresponding physical address that is used later with respect to FIG. 16.

Directed Fiber to the Premises ("FTTP") Embodiment

Figure 9:
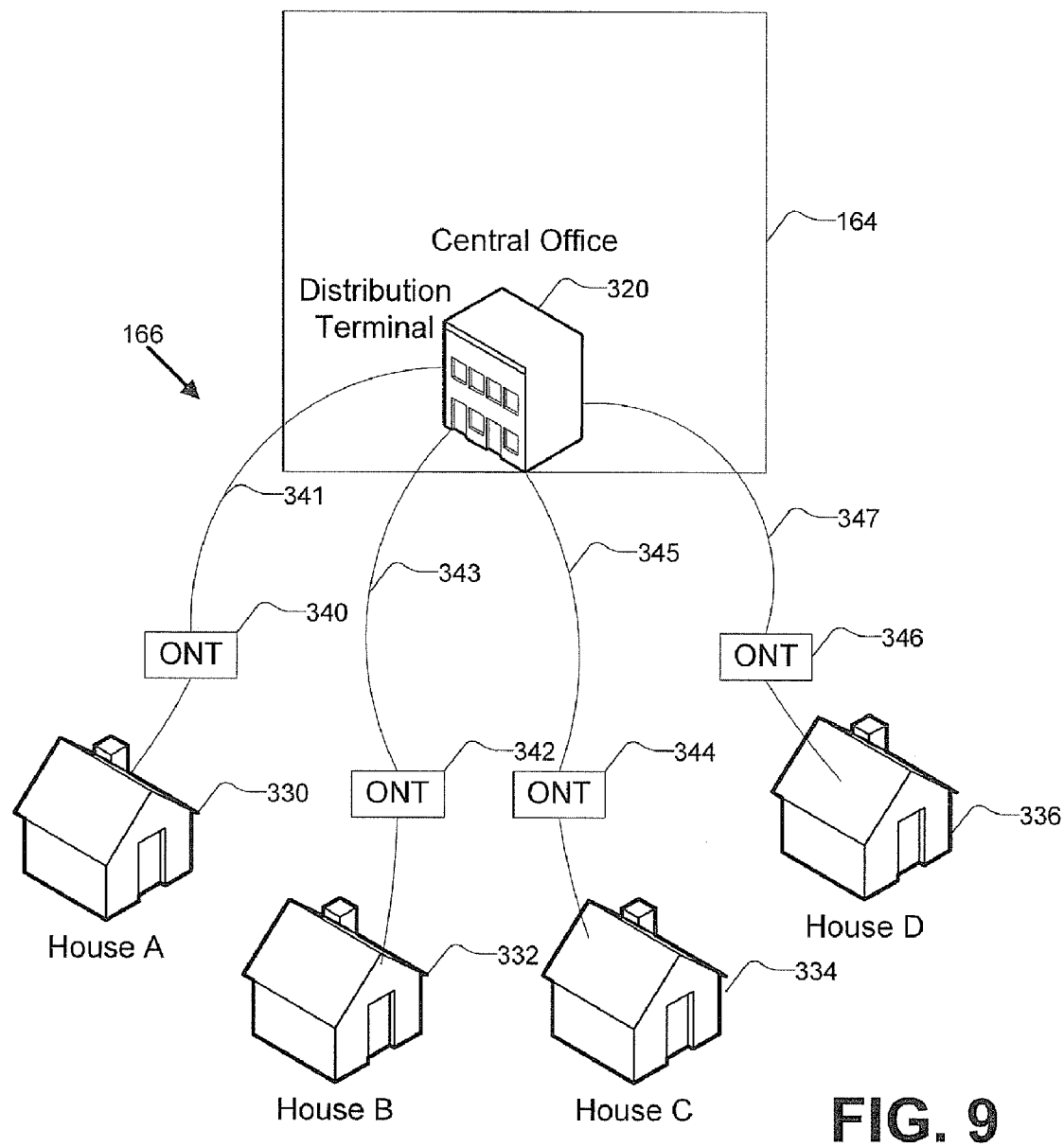
FIG. 9 illustrates an access network connection using directed fiber to the premises for use with the system of FIG. 6A.

Turning now to FIG. 9, an embodiment of access network connection 166 uses directed fiber to the premises 318 ("FTTP"). Here, central office 164 includes distribution terminal 320 to distribute network services. Distribution terminal 320 then selectively distributes data packets between multiple premises 330, 332, 334, 336 by a dedicated fiber 341, 343, 345, 347. Each of premises 330, 332, 334, 336 includes an ONT 340, 342, 344, 346 that performs the optical communications to and from distribution terminal 320. The routing of data at distribution terminal 320 is performed by a unique destination address assigned to each ONT 340, 342, 344, 346. In this way, there is no sharing of data along a common path because distribution terminal 320 selectively routes data to each ONT 340, 342, 344, 346. Thus, snooping or spying of data is not possible by any premises 330, 332, 334, 336 of another's data. ONT 302, as described above, interfaces the optical network and a home, business, fixed or known location, Generally ONT 302 interfaces an optical system to a wired system (e.g., copper-wire based Ethernet). ONTs 340, 342, 344, 346 act as terminals to the network enabled by central office 164. Central office 164 then bridges the network distribution layer of ONT 340, 342, 344, 346 with the network core layer of internal network 196 and network 74.

As described above with respect to dedicated fiber 300 (see FIG. 8), an attempt to snoop or spy on data transmissions between central office 164 and distribution terminal 320 will be known by central office 164. Moreover, an attempt to splice any of dedicated fibers 341, 343, 345, 347 is detectable by distribution terminal 320. Thus, a connection between central office 164 and any of premises 330, 332, 334, 336 is not shared and is highly secure. Moreover, data transmission between central office 164, distribution terminal 320, and each ONT 340, 342, 344, 346 is encrypted in hardware. Thus, even where a splice is connected, e.g. in order to snoop, the data transmission is further unavailable in clear text because of the data encryption.

Additionally, each ONT 340, 342, 344, 346 is assigned a unique identifier and only data bound for a specific premises is routed to the appropriate ONT 340, 342, 344, 346. Therefore, routing of data packets from central office 164 go to a known user at one of premises 330, 332, 334, 336. In this way, the trust chain is in place with a high level of confidence that only the appropriate user 140 will receive data assigned to them. Moreover, the dedicated line principle further enhances the trust chain. The identification of user 140 is placed the system at user record 230 in database schema 200. User identifier 52 and the hardware address of each ONT are filled to user's 140 corresponding physical address that is used later with respect to FIG. 16.

Passive Optical Network ("PON") Fiber to the Premises ("FTTP") Embodiment

Figure 10:
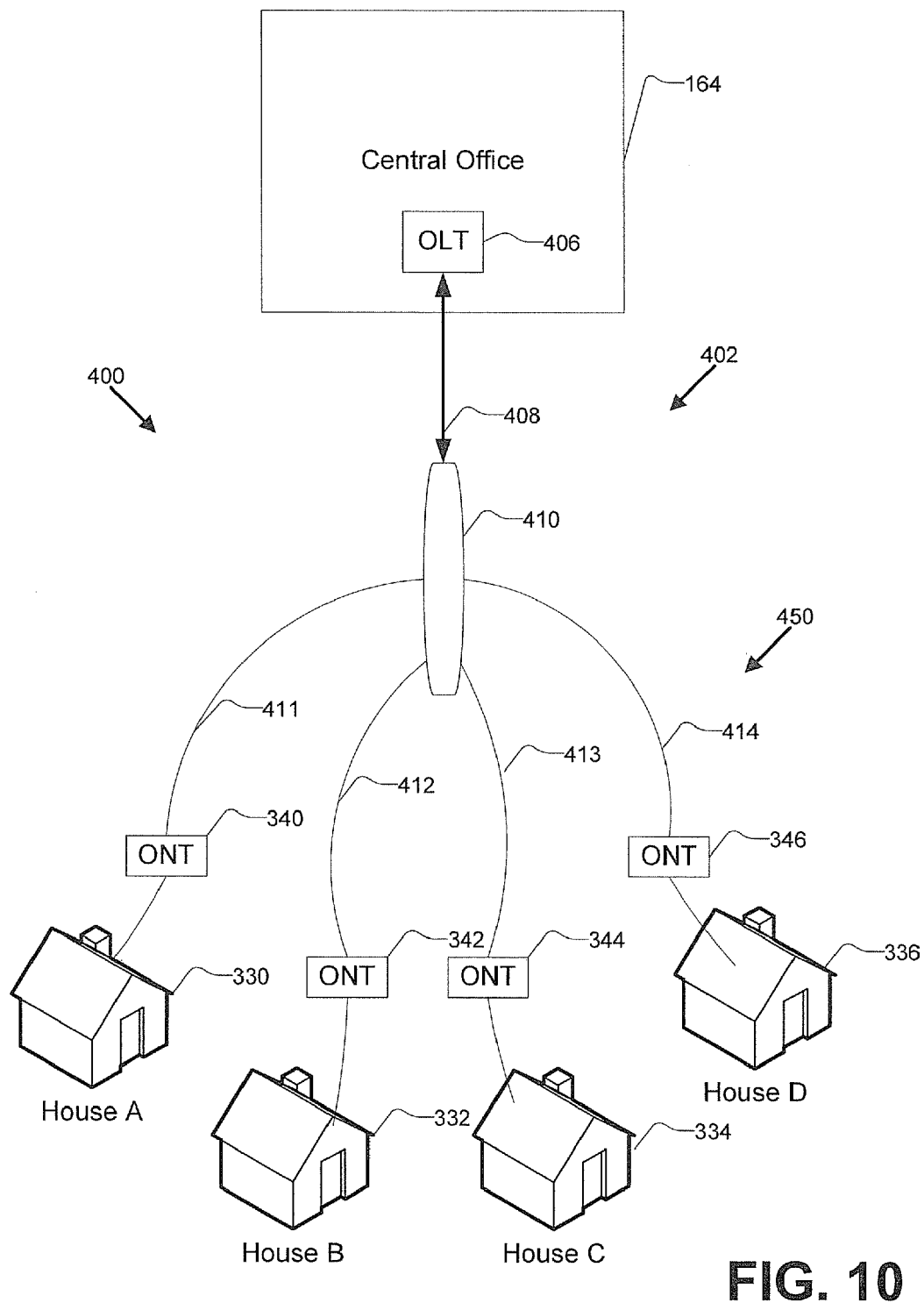
FIG. 10 illustrates an access network connection using a passive optical network fiber to the premises for use with the system of FIG. 6A.

Turning now to FIG. 10, an embodiment of access network connection 166 uses a passive optical network with a fiber to the premises topology 400 ("FTTP"). FTTP 400 is also known by names such as fiber to the house ("FTTH") and in the broadest sense by FTTx, which indicates "fiber to the" optical network unit, of some fashion. However, FTTP embodiments need not only connect to a house or residence. Indeed, FTTP may connect to a business, structure or other known location. Access network connection 166 using FTTP 400 is configured as a passive optical network 402 ("PON"). PON 402 may be embodied, for example, as standard ITU-T G.984 ("GPON"). FTTP 400 includes central office 164, an optical line terminal 406 ("OLT"), a short run connection 408, an optical splitter 410, and multiple line drops 411, 412, 413, 414 to ONTs 340, 342, 344, 346.

OLT 406 is typically located at central office 164 for distribution of network services. OLT 406 interfaces central office 164 and ONTs 340, 342, 344, 346. OLT 406 may be embodied primarily as an interface between the PON and a backbone network (e.g. time division multiplexed ("TDM") systems, SONET/SDH or PDH, Internet Protocol ("IP") systems or asynchronous transmission mode ("ATM") backbones). Moreover, OLT 406 may be embodied as physically present at central office 164.

Short run connection 408 connects OLT 406 to optical splitter 410. The network communication is farther subdivided into multiple line drops 411, 412, 413, 414 by optical splitter 410. Optical splitter 410 and multiple line drops 411, 412, 413, 414 constitute an optical distribution network 450 ("ODN") wherein the communication signals from OLT 406 are distributed to multiple ONTs 340, 342, 344, 346. Optical splitter 410 essentially splits the optical signals through short run connection 408 into multiple line drops 411, 412, 413, 414. Moreover, any upstream communications from ONTs 340, 342, 344, 346 are combined into short run connection 408 and passed to OLT 406. As discussed above, ONT 340 is a device that terminates the fiber optic network at premises, e.g. premises 330, 332, 334, 336. ONTs 340, 342, 344, 346 act as terminals to the network enabled by OLT 406 at central office 164. Central office 164 then bridges the network distribution layer of ONTs 340, 342, 344, 346 with the network core layer of internal network 196 and network 74.

In this embodiment the PON is a point-to-multipoint configuration using un-powered optical splitter 410 to distribute an optical signal to multiple premises 330, 332, 334, 336. Using a PON, there is a reduction in the amount of fiber and central office 164 equipment required because there is a shared connection from central office 164 up to optical splitter 410. ONTs 340, 342, 344, 346 are near users 140 and the fiber required for each individual user 140 is reduced to multiple line drops 411, 412, 413, 414. The PON is considered a shared network in that OLT 406 transmits a single stream of downstream traffic that is seen by all ONTs 340, 342, 344, 346. However, as explained below, each ONT 340, 342, 344, 346 only receives the data addressed to it by a unique ONT identifier. Moreover, encryption of communications between OLT 406 and ONTs 340, 342, 344, 346 prevents snooping of downstream traffic. Thus, the PON has the advantage of reducing fiber and equipment without sacrificing security.

To maintain the trust relationship described above, downstream signals at least from OLT 406 to each of ONTs 340, 342, 344, 346 utilize data encryption. In this way, ONTs 340, 342, 344, 346 cannot read data meant for another ONT 340, 342, 344, 346. Moreover, OLT 406 uses a unique data packet destination address to direct traffic to specific ONTs 340, 342, 344, 346 (e.g. each ONT 340, 342, 344, 346 has its own unique address). Each ONT 340, 342, 344, 346 filters received data packets and only passes the packets assigned to its own destination address. In this way, security is further enhanced in FTTP topology 400 such that ONTs cannot snoop on the network traffic of others due to the destination address filtering. User identifier 52 and the hardware address of each ONT are filled to user's 140 corresponding physical address that is used later with respect to FIG. 16.

Moreover, upstream signals from each ONT 340, 342, 344, 346 are combined using a multiple access protocol. Typically, the upstream signals from ONTs 340, 342, 344, 346 to OLT 406 are combined at optical splitter 410 using time division multiple access ("TDMA"). Periodically, OLT 406 will "range" ONTs 340, 342, 344, 346 to provide time slot assignments for upstream communication using TDMA. The TDMA method using optical splitter 410 provides that upstream communications from an ONT 340, 342, 344, 346 to OLT 406 are not received by any other ONT 340, 342, 344, 346. In this way, there cannot be snooping of upstream signals from one ONT 340, 342, 344, 346 to the other ONTs 340, 342, 344, 346. Therefore, the trust relationship for any key or password exchange between user 140 and certificate authority 120 is with high confidence.

Digital Subscriber Line ("DSL") Embodiment

Figure 11:
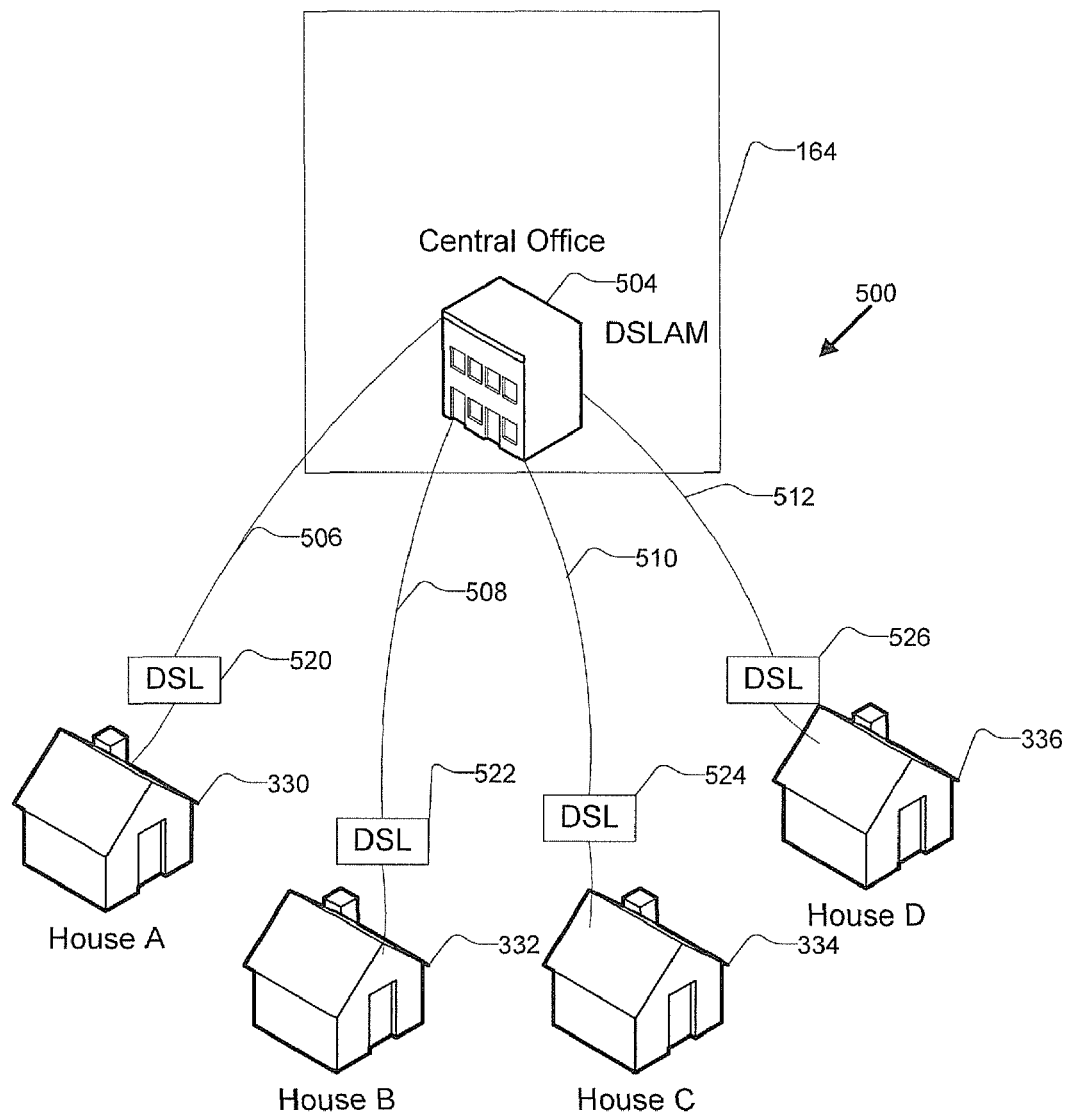
FIG. 11 illustrates an access network connection using a digital subscriber line for use with the system of FIG. 6A.

Turning now to FIG. 11, an embodiment access network connection 166 uses a digital subscriber line 500 ("DSL") topology. DSL 500 topology includes central office 164, a main connection 502, a digital subscriber line access multiplier 504 ("DSLAM"), a copper communications infrastructure 506, 508, 510, 512, and DSL modems 520, 522, 524, 526. Network communications between central office 164 and DSLAM 504 are carried out via main connection 502 which is typically an optical communication. Moreover, DSLAM 504 may be located at central office 164 and is connected to the network backbone. DSL embodiments may connect to a house, residence, business, structure or other known location. DSL modems 520, 522, 524, 526 act as terminals to the network enabled by DSLAM 504 at central office 164 and Central office 164 bridges the network distribution layer of DSL modems 520, 522, 524, 526 with the network core layer of internal network 196 and network 74.

DSLAM 504 is a network device that distributes communications from central office 164 to DSL modems 520, 522, 524, 526, as well as aggregates communications from DSL modems 520, 522, 524, 526 to central office 164. In essence, DSLAM 504 connects multiple DSL modems 520, 522, 524, 526 to the high-speed backbone network (e.g. time division multiplexed ("TDM") systems, SONET/SDH or PDH, Internet Protocol ("IP") systems or asynchronous transmission mode ("ATM") backbones). DSLAM 504 connects to DSL modems 520, 522, 524, 526 via copper communications infrastructure 506, 508, 510, 512, which is typically a public switched telephone network ("PSTN"). As shown, DSLAM 504 communicates with each DSL modem 520, 522, 524, 526 separately. Thus, DSL modems 520, 522, 524, 526 are not on a shared network and do not have the ability to snoop on each other.

In the embodiment shown, trust relationship 100, as mentioned above with respect to FIG. 4, is maintained with a high degree of confidence because snooping of the network connection is not enabled. Moreover, DSLAM 504 routes network traffic individually to DSL modems 520, 522, 524, 526 based on unique addresses. Therefore, network traffic is sent to a known user 140. In this way, the trust relationship is enhanced because the sender of network traffic knows with certainty the identity of the recipient, and that snooping is not available to the other DSL modems 520, 522, 524, 526 in the network.

Cable Embodiment

Figure 12:
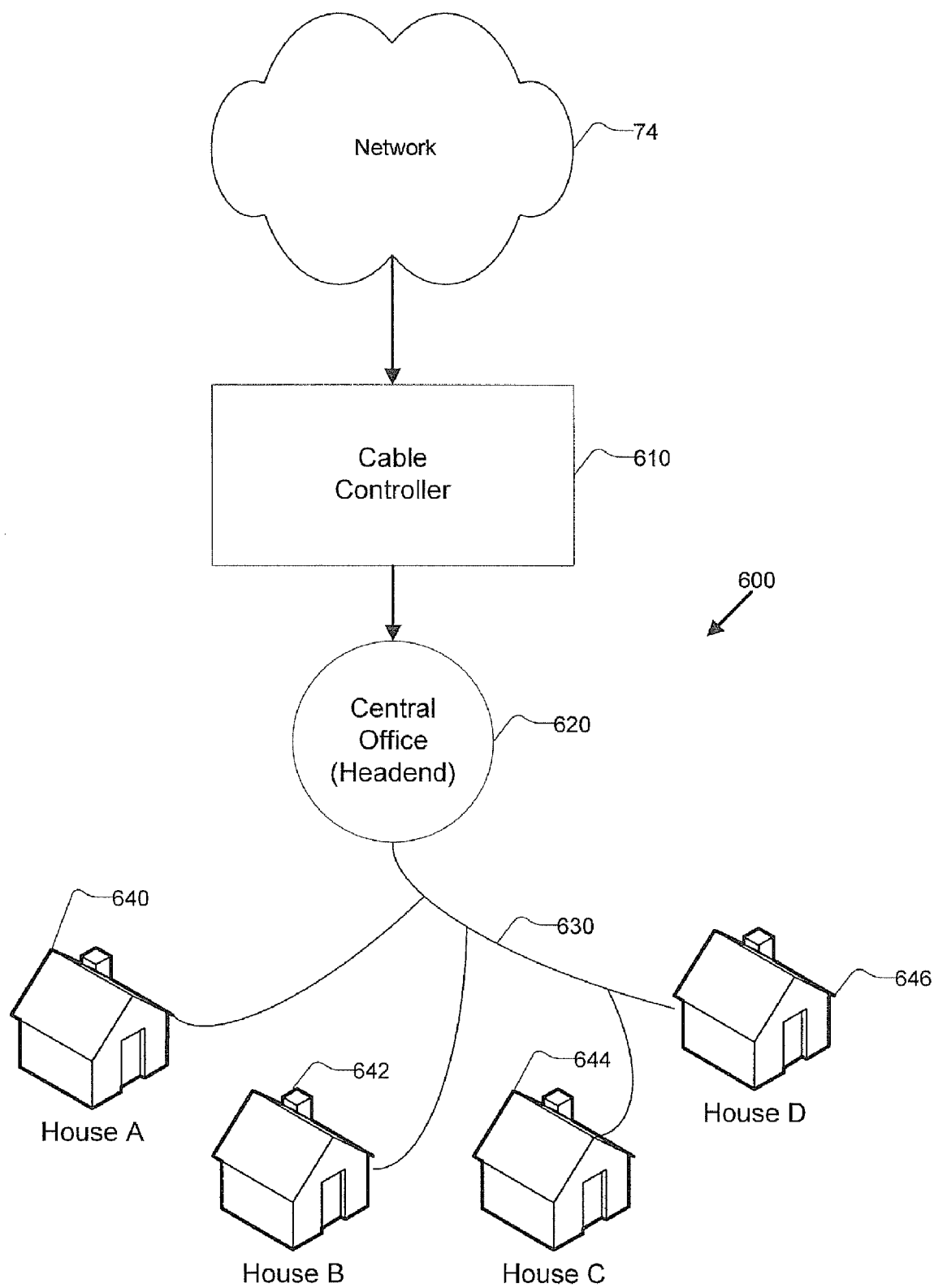
FIG. 12 illustrates an access network connection using coaxial cable for use with the system of FIG. 6A.

Turning now to FIG. 12, an embodiment access network connection 166 uses coaxial cable 630. Cable network 600 includes network 74, a cable controller 610, a headend 620, coaxial cable 630, and subscribers 640, 642, 644, 646. Each subscriber 640, 642, 644, 646 has a modem that converts the network signals of coaxial cable 630 to a local network (e.g., Ethernet, USB, or wireless). Cable controller 610 is a backbone device ultimately connecting subscribers 640, 642, 644, 646 to network 74, e.g. the Internet. Headend 620 bridges cable controller 610 with subscribers 640, 642, 644, 646 as a group. Thus, each subscriber 640, 642, 644, 646 has the ability to receive network traffic intended for another subscriber 640, 642, 644, 646. The modems for each subscriber 640, 642, 644, 646 act as terminals to the network enabled by head end 620. Cable controller 610 then bridges the network distribution layer of the modems with the network core layer of internal network 196 and network 74.

Because subscribers 640, 642, 644, 646 are able to receive all network traffic encryption and filtering should be used by each subscriber 640, 642, 644, 646 to increase the confidence of trust relationship 100, as mentioned above with respect to FIG. 4. The use of encryption of the communications between headend 620 and subscribers 640, 642, 644, 646, prevents the possibility of snooping. Moreover, packet filtering (e.g. destination packet filtering) requires that only messages designated for a particular subscriber 640, 642, 644, 646 are received by them. Thus, there is the appearance that network data is protected from snooping, i.e. eavesdropping, from others on cable network 600.

Although encryption and packet filtering may be used, the topology of cable networks 600 places numerous subscribers 640, 642, 644, 646 on the same data circuit and their network traffic is transmitted on coaxial cable 630 (e.g. a shared line). Thus, the special precaution of encryption is used. The encryption is important because it is possible to reconfigure the modems used by subscribers 640, 642, 644, 646 to receive all traffic, regardless of packet filtering. In some cases, the communication standards for cable network 600 do not require encryption (e.g. DOCSIS 1.0). However, encryption is optional, and will typically be used in order to protect trust relationship 100. In order to particularly identify user 140, user identifier 52 and the hardware address (e.g., MAC address) of each modem are filled to user's 140 corresponding physical address that is used later with respect to FIG. 16.

Network Authority

Turning back to FIG. 6A, network authority 162 is a hardware system (e.g. a computer) at central office 164 and acts as an intermediate agent between certificate authority network 180 and user 140. Network authority 162 bridges network 74 and access network connection 152 to user 140 and is positioned at central office 164 such that network authority 162 has direct access to access network connection 152. As part of the configuration of network authority 162 at central office 164, network authority 162 will assume control of network routing for user 140. In this way, network authority 162 is able to remove user 140 from normal path 830 (explained in detail below with respect to FIG. 6B) and essentially operate as a network element (e.g. router) for traffic to and from user 140.

In practice, network authority has the ability to access both access network connection 152 as well as internal network 196, and in some embodiments network 74. Moreover, because network authority 164 is located at the distribution layer of the delivery system 150' network authority 164 has the ability to provide secure networking functions directly from the point of access at access network connection 152 for user 140.

Network authority 162 is provided communication access to internal network 196, as well as access network connection 166 to user machine 198. Thus, network authority 162 may communicate via internal network 196 to CA network 180. Moreover, network authority 162 communicates directly to user 140 through access network connection 166. Because network authority 162 may communicate with both CA network 180 and user 140, network authority 162 may act as a communications proxy between them for delivering private key 36. By using network authority 162 in delivery system 150, a registration authority 130 is not required. Therefore, network authority 162 will increase confidence in trust relationship 100, as well as reduce cost in delivery system 150.

Figure 13:
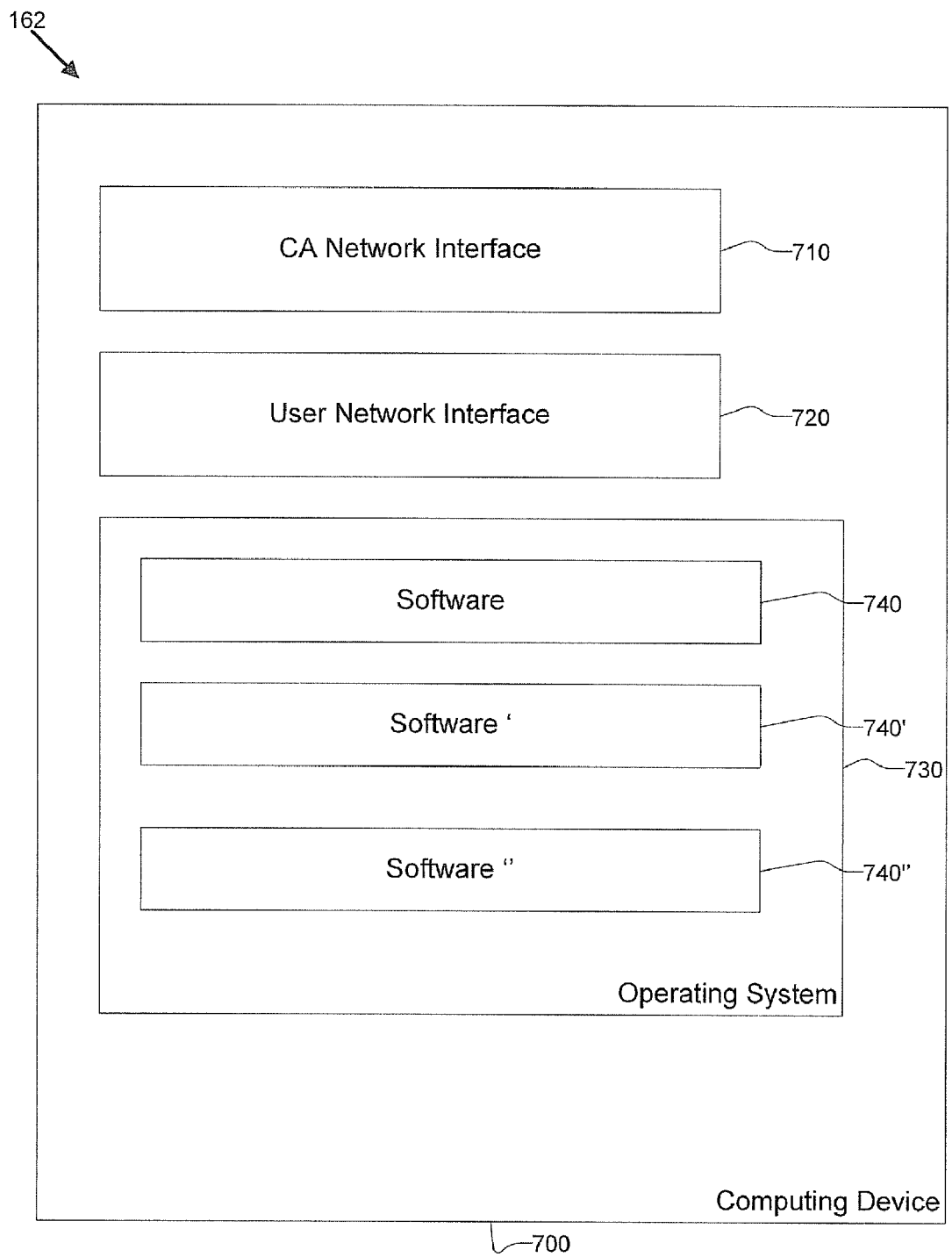
FIG. 13 illustrates a network authority for use with the system of FIG. 6A.

As shown in FIG. 13, network authority 162 includes a computing device 700, a CA communications interface 710, a user communications interface 720, an operating system 730, and software 740. Operating system 730 provides a framework for network authority to operate. CA communications interface 710 is a network adapter for communicating with CA system 160 via internal network 196. User communications interface 720 is a network adapter for communicating with user 140. As explained above in detail, access network connection 166 may be embodied as a number of network infrastructures and topologies. For example, the networks may be dedicated fiber 300, directed fiber to the premises 318, passive optical network with a fiber to the premises topology 400, digital subscriber line 500, or cable network 600.

Thus, user communications interface 720 is embodied to match the type of infrastructure supported by access network connection 166. Alternatively, network authority 162 may be embodied with only CA communications interface 710. As network authority 162 is connected to internal network 196, network authority 162 can communicate with CA network 180 as well as designating user 140 as the recipient of network traffic from internal network 196.

Software 740 includes programs to be executed on computing device 700 that perform various communications and verification functions. For example, software 740 may include VPN software 740', enabling connection to CA network 180. Additionally, Dynamic Host Configuration Protocol ("DHCP") and Point to Point Protocol ("PPP") may be used for providing network connectivity to user 140. Moreover, depending upon the configuration of central office 164, software 740" may include Routing Information Protocol ("RIP"), Border Gateway Protocol ("BGP"), Open Shortest Path First ("OSPF"), or other network routing protocols, and Berkley Internet Name Daemon ("BIND") so that user 140 would have access to Domain Name Services ("DNS").

In addition, application software is used to enable the system and processes as described herein. Because network authority 162 is acting as a proxy between user 140 and CA network 180 for delivery of private key 36, an MD5 algorithm is used to produce a digital signature (e.g. checksum) to verify the integrity of the software mentioned above. For example, before any processes begin where network authority 162 would facilitate transfer of public key 30 from CA network 180 to user 140, software 740 must be validated to avoid the possibility that tampering may allow a rogue network authority 162 to snoop on the transmission. Application software, in general, monitors network authority 162 and the communications link between CA network 180 and user 140, verifies software 740 statuses, performs encryption, and communicates with CA network 180 before beginning a communication session by VPN.

To reduce the risk of having rogue software installed at network authority 162, operating system 730 may be embodied as a Berkeley Software Distribution ("BSD") system which is a derivative of UNIX. However, BSD is different enough such that a rogue user would be required to invest significant capital into developing rogue software to perform snooping tasks, Thus, by providing network authority 162 with a relatively obscure operating system 730, the risk of rogue software is reduced.

User

User 140 may be a person, a location, or an entity described by their connection to access network connection 166. In many cases, user 140 is a subscriber to a telecommunications service provided by access network connection 166. Moreover, user 140 may be a family, house, or individual. In these cases, use of delivery system 150 provides an economical means to be assigned certificate 50 and private key 36.

User machine 198 is typically a personal computer ("PC"). Thus, the PC must be secured before private key 36 is received. Because delivery system 150 emphasizes security to enhance trust relationship 100, the security of user machine 198 should be determined before private key 36 is received. Otherwise, if the security of user machine 198 is compromised, private key 36 may be misappropriated.

In practice, access network connection 166 identifies user 140 and user machine 198 because access network connection 166 is secure and is mapped to a particular user 140. Because of the mapping of user 140 to access network connection 166, trust relationship 100 is maintained because user 140 is identified by a physical connection and cannot be an imposter.

Network Paths

Figure 6B:
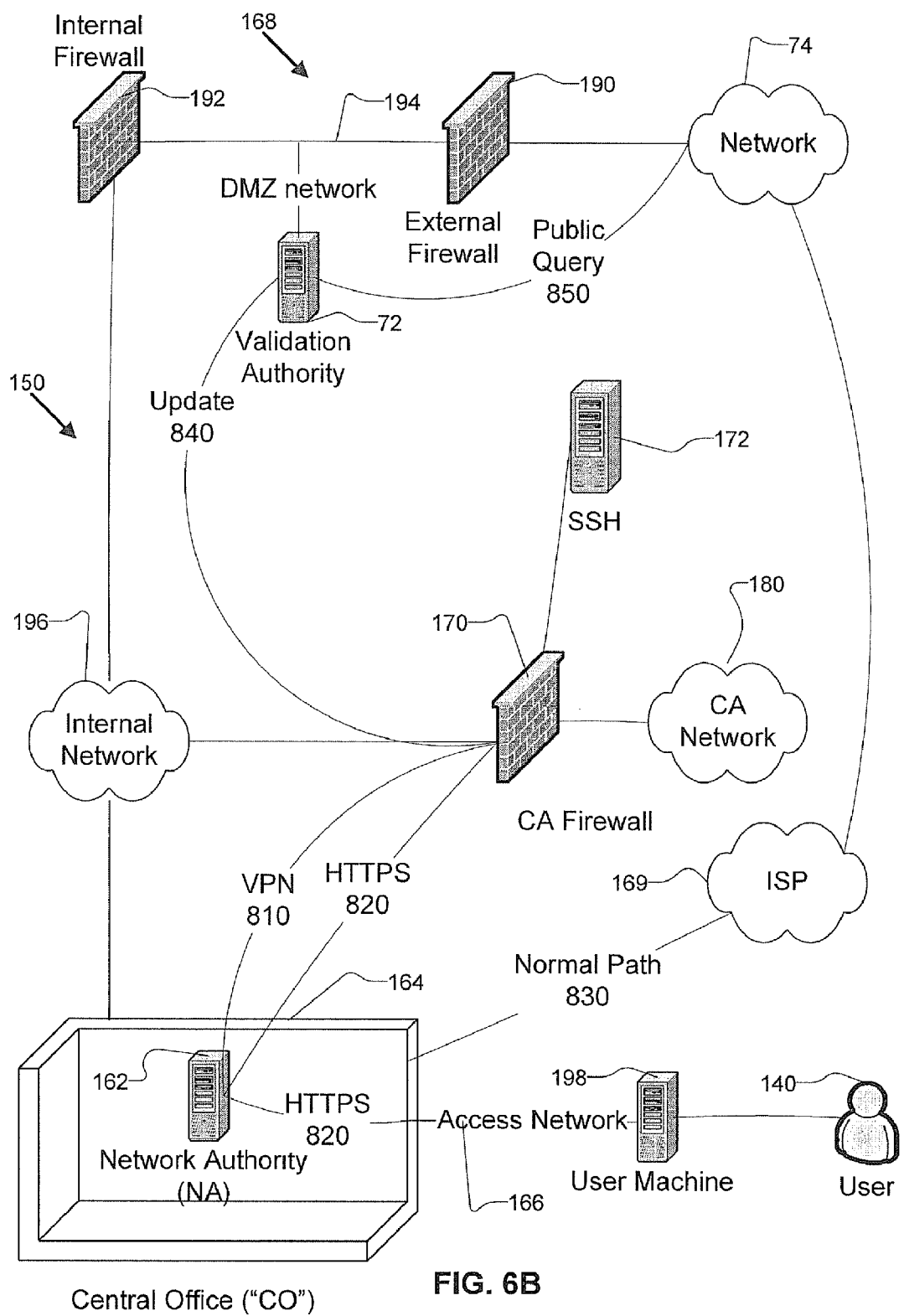
FIG. 6B illustrates network communication paths of FIG. 6A.

FIG. 6B illustrates network communication paths 800 of FIG. 6A including a secure session 810, an encrypted communication 820, a normal path 830, an update path 840, a public query path 850, and a network authority login path 860. In an exemplary embodiment, secure session 810 is a VPN between network authority 162 and CA network 180. However, secure session 810 need not exclusively be embodied as a VPN. Secure session 810 is transmitted through internal network 196, but is not susceptible to eavesdropping (snooping) because the VPN connection is encrypted.

Encrypted communication 820 between user 140 and certificate authority network 180 is enabled through secure session 810. The encrypted communication is in an exemplary embodiment a secure socket layer ("SSL") or Hypertext Transfer Protocol over Secure Socket Layer ("https") implementation. However, any form of encrypted communication may be employed. When encryption is used between user 140 and certificate authority network 180, network authority 162 cannot eavesdrop or snoop on the communications therebetween. In effect, network authority 162 has initiated a private and secure virtual network between user 140 and certificate authority network 180 that cannot be eavesdropped upon. Moreover, encrypted communication 820 is transmitted on internal network 196, but is not snoopable because of secure session 810 (e.g., a VPN) as well as because encrypted communication 820 is cryptographically safe in and of itself. To other nodes on internal network 196, encrypted communication 820 is doubly protected.

In addition to providing secure session 810, network authority 162 is able to provide the private network (e.g., secure session 810) directly from access network connection 152 at central office 164, by virtue of being located at central office 164. This capability allows secure session 810 to be initiated at the closest possible network location to user 140.

When not using delivery system 150, user 140 may access network 74 from central office 164 by normal path 830 through ISP 169. In an exemplary embodiment, the typical use of central office 164 is to provide connectivity between user 140 and network 74 for general use. However, in an exemplary embodiment, when delivery system 150 is being used network authority 162 completely disconnects user 140 from normal path 830 and allows only VPN access to certificate authority network 180.

Update path 840 is a one-way communication from local validation authority 176 to validation authority 72. CA firewall 170 allows local validation authority 176 outgoing communications to perform the update of certificate revocation list 76 and certificate storage 90 to validation authority 72. Thus, a security threat is not present to CA network 180 in that only outgoing communications are allowed to DMZ network. Internal firewall 192 is configured to allow update path 840 to communicate with DMZ network 194 and validation authority 72.

Public query path 850 is a network connection from user 140' to DMZ network 192 via network 74. User 140' is different than user 140 in that user 140' typically accesses network 74 via a public network, such as the internet. User 140' communicates via public query path 850 to perform certificate validation and to gain possession of public keys and certificates 50 (described in detail with respect to FIG. 3). For example, user 140' may query validation authority 72 as to the validity of certificate 50. Provided certificate 50 or identifier 52, validation authority 72 will respond with "valid" or "invalid" based on whether certificate 50 is present in certificate revocation list 76 and whether certificate 50 is in certificate storage 90. Moreover user 140' may request public certificate 50 given identifier 52. In this way, user 140' need not receive certificate 50 from user 140. Rather, user 140' may obtain certificate 50 from a trusted source, e.g., validation authority 72.

Network authority login path 860 is a connection through internal network 196 to secure shell 172. Network authority login path 860 does not enter certificate authority network 180, as CA firewall 170 protects certificate authority network 180 until a VPN is established therethrough. Network authority login path 860 is the initial connection from network authority 162 to secure shell 172, including the identification and validation tasks necessary before network authority 162 is connected via VPN. The identification, validation, and initial VPN request sequence for network authority 162 is described in detail below with respect to FIG. 18.

Operation and Use of Delivery System

Figure 14:
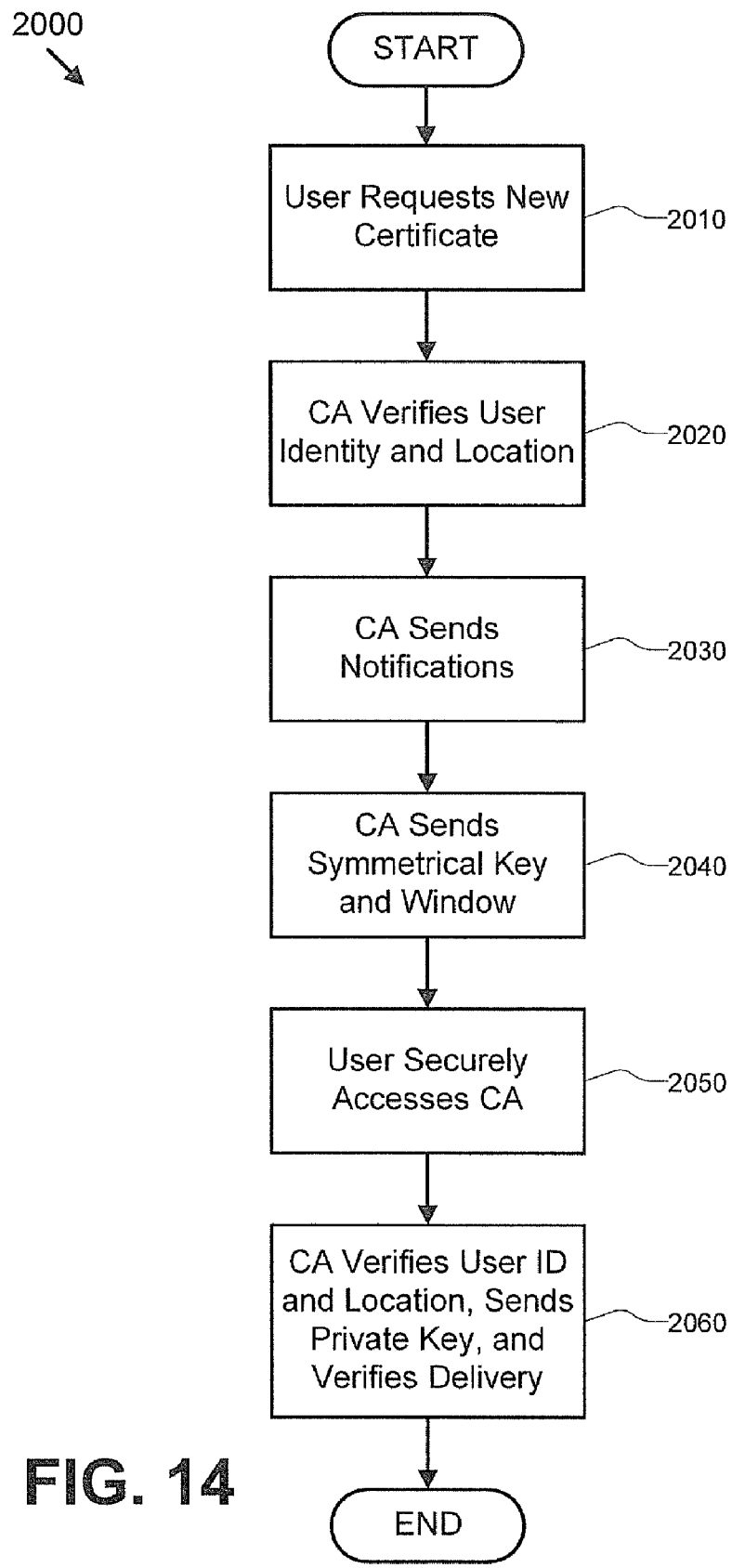
FIG. 14 illustrates a flow diagram for a new certificate request for use with the private and public key encryption system of FIG. 1 and FIG. 6A.

Now turning to FIG. 14, a flow diagram for a new certificate request process 2000 is shown. When user 140 desires a new certificate 50 and private key 36, the identity and validity of the request must be determined. Thereafter, private key 36 must be delivered securely such that only requesting user 140 is the recipient. New certificate request process 2000 begins at step 2010 where user 140 requests new certificate 50 and new private key 36. The request may come by way of a network-based request (e.g. a secure web-page, e-mail, etc.), a phone request (e.g. an automated phone agent), or a written request (e.g. a form delivered by mail). In an exemplary embodiment, the request is received via a corporate web page of networking service provider 75 that has the ability to check billing records to verify the identity of user 140 and user's 140 method of connection, (e.g., DSL 400, FTTP 400, etc.). Moreover, other methods of requests are contemplated that provide a secure request. Additionally, the request may be provided directly or indirectly by certificate authority 120. That is to say, when a request is received, the information contained in the request may be provided in the form of a database entry or entry of a request from personnel overseeing certificate authority 120. In order to initially verify the identity of user 140, personal information may be required. Additionally, where the request comes from a network interface or phone, the network address and/or phone number may be used as a factor to initially identify the user. Request process 2000 then continues to step 2020.

In step 2020, after receiving the request for new certificate 50 and new private key 36, certificate authority 120 performs identity verification of user 140 and informs user 140 that a request was made. Verification of identity is critical to the trust relationship 100 provided by certificate system 70 and delivery system 150. Thus, a thorough matching of identifying characteristics is required. The matching may include name, address, date of birth, account information where user 140 is a subscriber to network service provider 75 (see FIG. 5), and other identifying characteristics. More specific identifying information is provided in access network connection 166 that is associated with the account information provided in the request. In this case, the request for new certificate 50 and new private key 36 may be tracked to access network connection 166 and user 140 may be identified therefrom. Request process 2000 then continues to step 2030.

In step 2030, certificate authority 120 provides that attempts are made to contact user 140 with information that new certificate 50 has been requested. The attempts may be via e-mail, automated phone message, and mail. In these communications, user 140 is provided with an unequivocal statement that new certificate 50 has been requested by them, and that if no new certificate 50 has been requested, the consequences are similar, if not more severe than, identity theft. Moreover, user 140 is provided the means to notify certificate authority 120 by numerous means (e.g. e-mail, web-site, automated phone system, etc.) in order to immediately invalidate the request for new certificate 50. Additionally, the attempts to contact user 140 may be through numerous channels, e.g. phone, e-mail, and mail, such that a person attempting to request new certificate 50 would have to monitor and steal messages over numerous types of communications channels.

While certificate authority 120 is attempting to weed out fraud by contacting user 140, certificate authority waits for a time period, e.g. two (2) weeks, in order for user 140 to respond with an invalidation request where user 140 has not in fact requested new certificate 50 and new private key 36. At the end of the time period, a completion time window opens 238 where user 140 may complete the registration and receive new certificate 50 and new private key 36. If user 140 has requested invalidation due to a fraudulent request determined by the communications from certificate authority 120, certificate authority 120 abandons the request and the process terminates. Alternatively, completion time window 238 may open immediately. That is to say, if timeliness of delivery for private key 26 is desired, the waiting time may be reduced substantially to zero. When the completion time window 238 opens, request process 2000 continues to step 2040.

In step 2040, certificate authority 120 has determined that the identity of user 140 is authentic and call now proceed with issuing new certificate 50 and new private key 36. To this end, certificate authority 120 mails user 140 a web-site location, e.g. a universal resource locator ("URL"), where user 140 may securely initiate communications to receive new private key 36 and, if preferred, new certificate 50. New certificate 50 is not required for delivery of new private key 36 as certificate 50 may be downloaded later from validation authority 72 at any time. As an additional security measure, certificate authority 120 also sends via mail temporary symmetrical key 234 (e.g., a password) used to further authenticate user 140. Request process 2000 then continues to step 2050.

In step 2050, time window 238 is open and user 140 is allowed to contact certificate authority 120 to verify identity by sending a symmetrical key and receive new certificate 50 and new private key 36. At this time, user 140 enters a secure session in a web browser, e.g. a secure socket layer ("SSL") session to a secure web-site assigned by certificate authority 120 and transmitted in step 2040. In an exemplary embodiment, a secure web-site is embodied as a software component operating on certificate authority 120. However, the secure web-site may also be embodied outside of certificate authority network 180.

When user 140 initiates communication with the secure web-site, network authority 162 begins a secure virtual private network ("VPN") sessions with certificate authority network 180. As explained below in detail with respect to FIG. 17, network authority 162 includes a self-check and identity authentication before allowing the privilege of connecting with certificate authority network 180.

With the VPN connections made by network authority 162 to certificate authority 120, certificate authority 120 requests that network authority 162 identify access network connection 166 by a unique identifier. Certificate authority 120 then verifies the identity of user 140 by mapping the identifier associated with access network connection 166 with user 140. If access network connection matches user 140, certificate authority 120 requests final identification of user 140 by requesting the symmetrical key sent to user 140 in step 2040.

Although not necessary, as further insurance of the security of delivery system 150, certificate authority 120 may scan user machine 198 to determine if a minimum level of security exists. By scanning user machine 198, certificate authority 120 may determine whether or not a firewall is in place at user machine 198 as well as, for example, virus scanning software. If no protection is in place, the delivery of new private key 36 may not be warranted because the system receiving new private key 36 is not secure. In general, the party requesting and receiving a newly issued certificate (e.g. user 140) must appropriately safeguard new private key 36. If poor security is used on the part of the requesting party, then the issued certificate, and the private key, may be compromised. For example, if user 140 has no protection, e.g. a firewall, at user machine 198, then the certificate may be stolen and used to impersonate the requester. If the security at user machine 198 is deemed inadequate, certificate authority 120 may abandon the delivery attempt because user machine 198 is insecure. Request process 2000 then continues to step 2060.

In step 2060, certificate authority 120 matches the identifying information of user 140 with data stored in database(s) 174, including the user identifier 52 based on access network connection 166 and the symmetrical key. If either the symmetrical key or the identification based on access network connection 166 does not match the expected values, certificate authority 120 abandons the attempt to deliver new certificate 50 and new private key 36 and the process ends.

If all information matches the expected values stored in database(s) 174, certificate authority 120 delivers new certificate 50 and new private key 36 through the VPN connection established by network authority 162. Because network authority 162 has initiated a VPN between user 140 and certificate authority 120, network authority 162 is never in possession of un-encrypted new private key 36. That is to say, network authority is functioning to securely pass new private key 36 to user 140 and is never in possession of new private key 36 because it is encrypted. Moreover, network authority 162 never persists new private key 36 in any storage other than temporary random access memory ("RAM") in an encrypted state.

After certificate authority 120 has transmitted new private key 36 to user 140 securely through the VPN, a script operating through the web-site determines a successful delivery. At that time, certificate authority 120 registers new certificate 50 with database(s) 174 and local validation authority 176 with the trust relationship 100 established through use of certificate request process 2000. In this embodiment, the only entities listed in the trust relationship are certificate authority 120 itself, as well as user 140. Because network authority 162 was never in possession of an un-encrypted version of private key 36, network authority 162 need not be listed in the trust relationship. With delivery complete and possession of new private key 36 verified by user 140, certificate request process 2000 ends.

Figure 15:
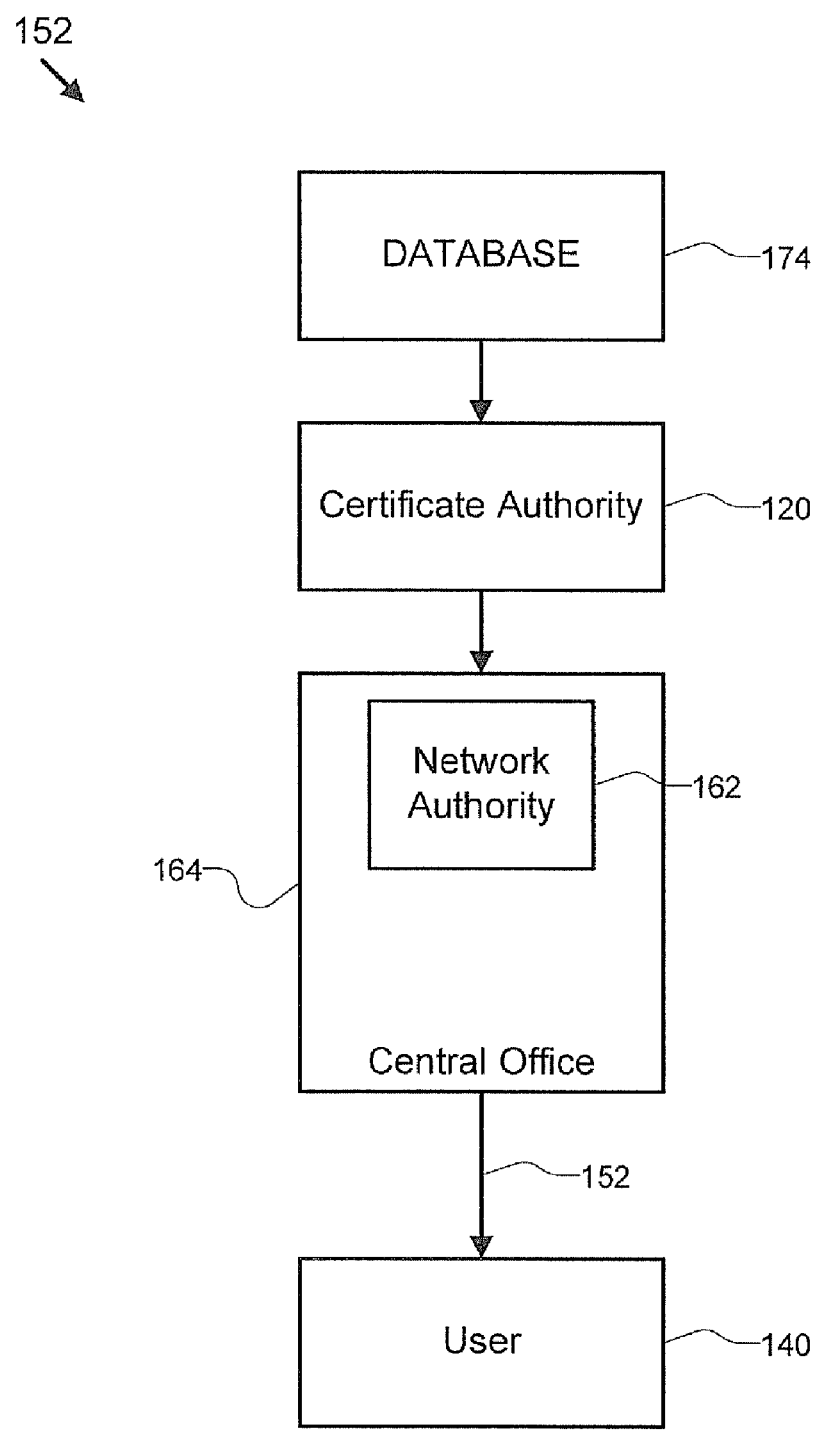
FIG. 15 illustrates a system diagram detailing a known connection to a user for private key delivery for use with the system of FIG. 6A.

FIG. 15 illustrates a system diagram detailing a known connection 152 to a user 140 for private key 36 delivery. Network authority 162 determines user's 140 identity from the physical connection of access network connection 166, and in some embodiments a unique identifier assigned to user 140 and embedded in a hardware interface. Alternatively, network authority 162 will determine user's 140 subnet or geographic location where more specific identifying information is not available. Database(s) 174 stores information related to users 140 in user records 230 (described above in detail with respect to FIG. 7A). Included in user record 230 is a mapping of an identity (e.g. name, account number, etc.) with a unique identifier for physical connection 166.

Provided the information in database(s) 174, and the ability of network authority 162 to determine the unique identifier for physical connection 166, certificate authority 120 may query database(s) 174 to match an identity of user 140 with access network connection 166. Alternatively, certificate authority 120 may query database(s) 174 to match access network connection 166 with user 140. In this way, certificate authority 120 determines where to send a message (e.g. a user's 140 address), or where a request is coming from based on access network connection 166 or an identity of user 140. In this way, trust relationship 100 is enhanced because any request for new private key 36 is from a known entity (user 140). Therefore, certificate authority cannot be tricked or mislead into inappropriately creating new certificate 50 and new private key 36 and transmitting them to an imposter. By virtue of the known access network connection 166, via a physical connection, certificate authority 120 has a high confidence that the correct user 140 receives new private key 36.

Figure 16:
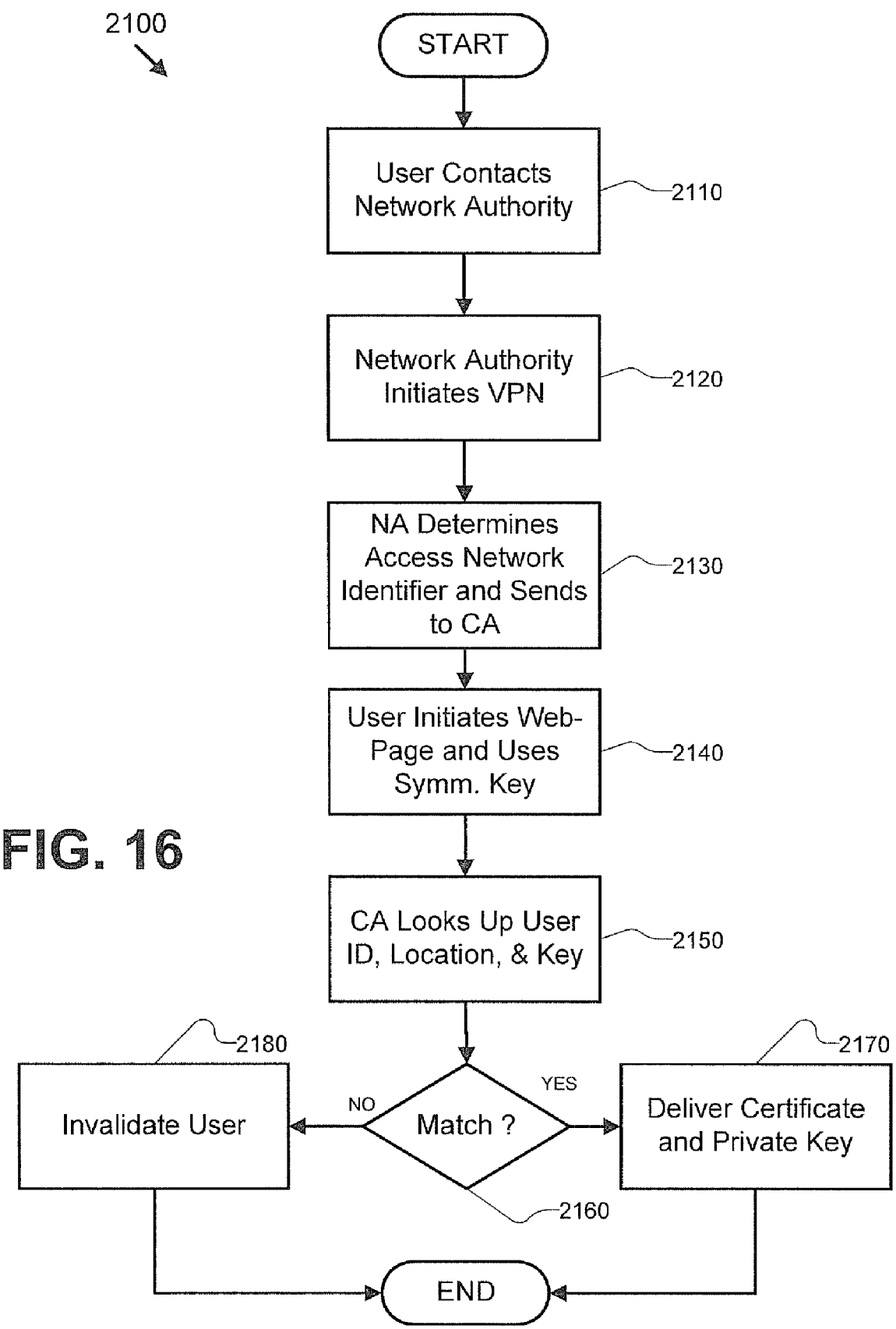
FIG. 16 illustrates a flow diagram of validation of user identity and delivery of a new certificate for use with the system of FIG. 6A.

FIG. 16 illustrates a flow diagram of validation process 2100 of user identifier 52 and delivery of new certificate 50 and new private key 36. Validation process 2100 begins at step 2110 where user 140 contacts network authority 162 at the web-site location provided by certificate authority 120 in step 2040 above (see FIG. 15). Control then proceeds to step 2120.

In step 2120, network authority 162 performs a self check and initiates communication with secure shell 172. Network authority 162 then sends secure shell 172 the validation information. Secure shell 172 verifies the validation information and also checks that network authority 162 has the appropriate network location. Upon successful authentication of network authority 162, secure shell 172 begins a VPN between certificate authority 120 and network authority 162. Network authority 162 now routes traffic from user 140 to certificate authority network 180 by way of the established VPN connection. In this way, network authority 162 has created a private network from central office 164 directly to certificate authority network 180, essentially and end-to-end private and secure network connection between user 140 and certificate authority network 180 that is not shared. Moreover, once user 140 and certificate authority network 180 are connected, user 140 initiates secure communication with certificate authority network 180 (e.g., a SSL connection) such that network authority 162 is not able to snoop on any network traffic between user 140 and certificate authority network 180. Control then proceeds to step 2130.

In step 2130, network authority 162 facilitates identification of user 140 by the physical connection of access network connection 166. Network authority 162 determines a network location of user 140 by virtue of being located at central office 164 and having access to access network connection 166 equipment. Alternatively, central office 164 may be configured to retrieve identifying information about user 140 without the assistance of network authority 162 (e.g., user 140 is identified by a software tool executed by user 140 at user machine 198). Network authority 162 then transmits the access network connection 166 identifier to certificate authority 120 for validation. Control then proceeds to step 2140.

In step 2140, certificate authority 120 locates the network location of user 140 by referencing database(s) 174, requests and receives temporary symmetrical key 234 (e.g., sent earlier by mail) from user 140, and looking up the required information using User identifier 52. Control then proceeds to step 2150.

At step 2150, user 140 initiates communication with certificate authority 120 and provides the symmetrical key. Certificate authority 120 looks up all identity verification information from database(s) 174 and prepares to compare user record 230 with the received information. Control then proceeds to step 2160.

In step 2160, certificate authority 120 compares user record 230 with the received information from user 140. If all of the information does not match, control then proceeds to step 2180. If all of the information does match, certificate authority 120 initiates a key download sequence from the web-page.

In step 2170, user 140 is prompted for a challenge password in an appropriate format, and if correct, certificate authority 120 delivers new certificate 50 and new private key 36 via secure VPN. Once delivered, certificate authority 120 verifies that user 140 received new private key 36. Validation process 2100 then ends.

In step 2180, where a mismatch has occurred, user record 230 is immediately removed from database(s) 174 to prevent fraud. If user 140 does not pass each and every check, for example the symmetrical key test, user 140 must reapply in new certificate request process 2000 or otherwise revive the request for a new key. Validation process 2100 then ends.

Figure 17:
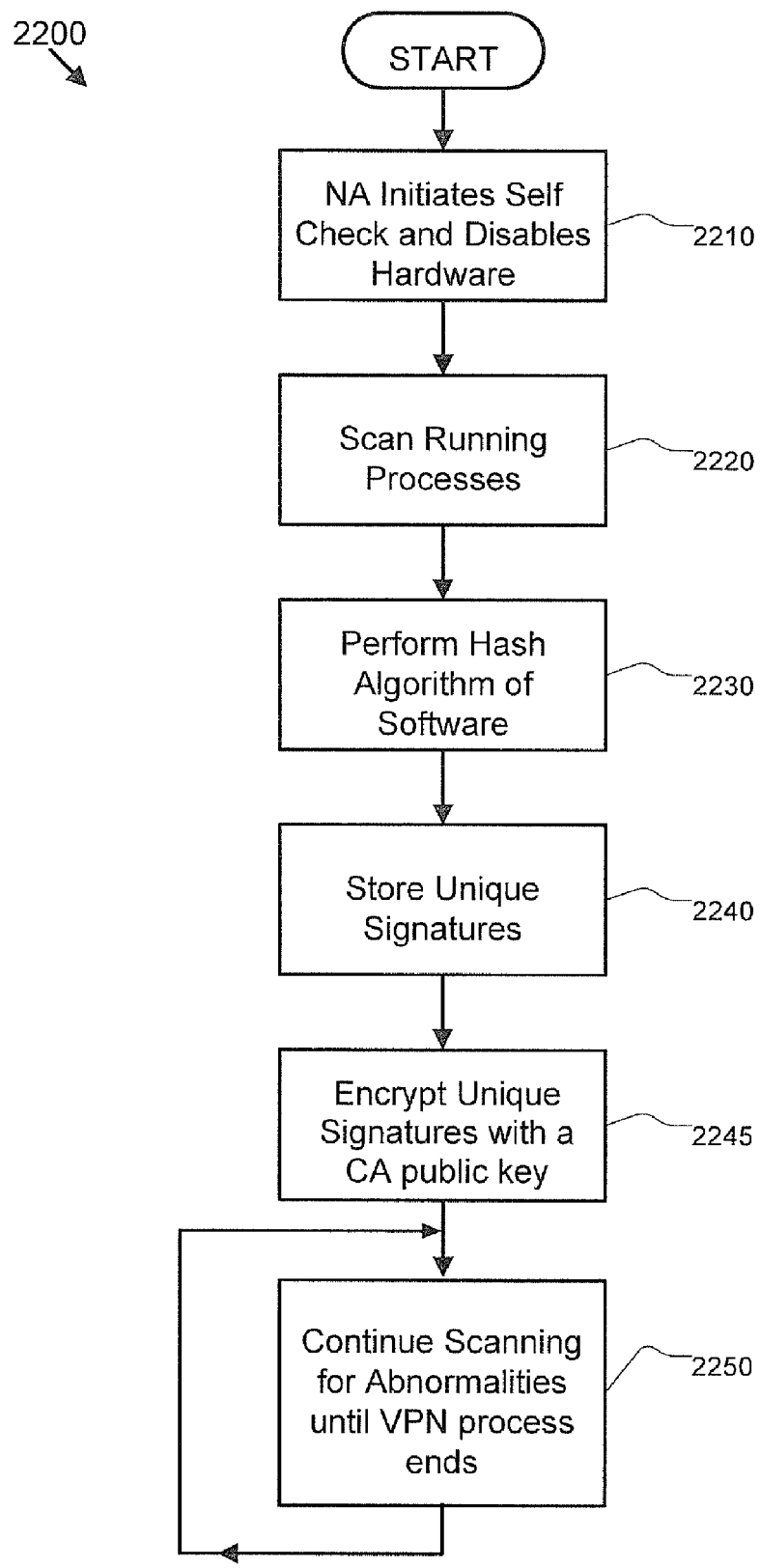
FIG. 17 illustrates a flow diagram of a network authority self check for use with the system of FIG. 6A.

FIG. 17 illustrates a flow diagram of a network authority 162 self check 2200. When network authority 162 begins operation and before attempting to connect to certificate authority network 180, network authority 162 first performs self check 2200 to determine if any hardware or software has been modified that could jeopardize security. Self check 2200 begins at step 2210 where network authority 162 disables certain hardware functions to ensure that un-authorized hardware cannot affect self check process 2200. The disabling of hardware includes processing cards that may be installed, network interfaces, and peripherals, e.g. a keyboard. Control then proceeds to step 2220.

At step 2220, network authority 162 scans any executing processes on operating system 730 to determine if any unauthorized processes are running that could affect the integrity of self check process 2200. When only the appropriate processes are running, control proceeds to step 2230.

At step 2230, network authority 162 performs a hash algorithm, e.g. MD5 or checksum algorithm, on software 740 shown in FIG. 13. The hash algorithm reviews all data (bytes) of software 740 and generates a unique signature for each piece of software 740. Control then proceeds to step 2240.

At step 2240, the unique signatures are stored for use with the initiation of access to certificate authority 120. Network authority 162 enables the network communications interface to certificate authority 120 and may begin the process to access certificate authority 120 as shown below in detail with respect to FIG. 18. At step 2245, the unique signatures may be encrypted with a CA public key 30 from Certificate Authority 120. Control then proceeds to step 2250.

At step 2250, network authority 162 continues to scan network interfaces, hardware, running processes, and software 740. If any abnormalities arise, network authority 162 deems itself compromised and reports the compromise to certificate authority 120 which in turn terminates any open VPN channel with network authority Moreover, network authority 162 reports any change to software 740 to certificate authority 120 for storage in database(s) 174. The software 740 information stored in database(s) 174 may be used to determine whether tampering has occurred and if there is an ongoing problem with network authority 162. Self check 2200 then repeats step 2250 until the VPN process has completed.

Figure 18:
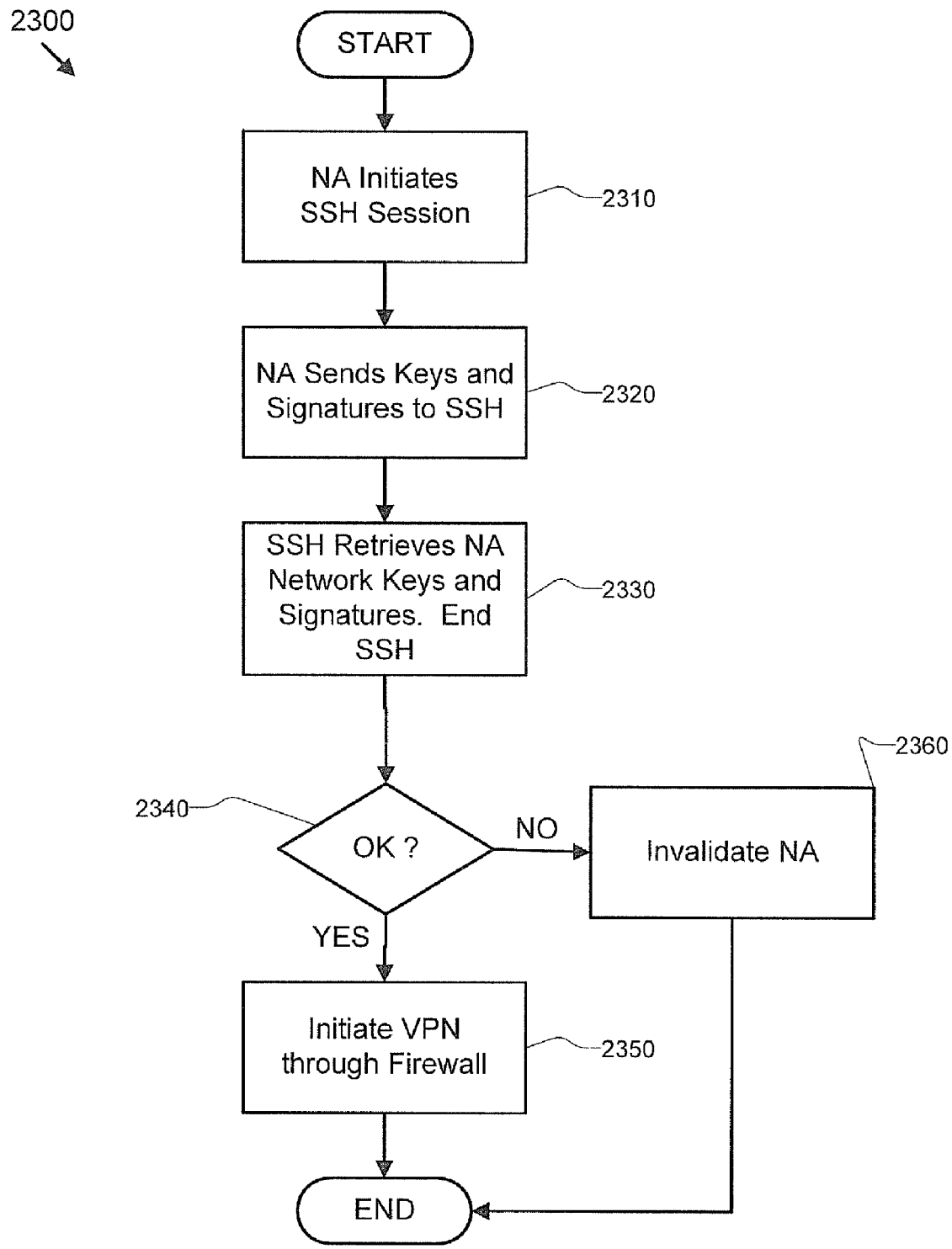
FIG. 18 illustrates a flow diagram of network authority authentication process for use with the system of FIG. 6A.

FIG. 18 illustrates a flow diagram of network authority 162 authentication process 2300. Here, certificate authority 120 authenticates the identity of network authority 162. While reading authentication process 2300, delivery system 150 should be referenced as shown in FIG. 6A for clarity. Before a VPN channel is allowed to be opened between certificate authority 120 and network authority 162, the identity and integrity of network authority 162 must be determined. Authentication 2300 begins at step 2310 where network authority 162 contacts secure shell 172 and initiates a session. Control then proceeds to step 2320.

At step 2320, network authority 162 sends network authority ID 242, identification keys, the unique signatures for software 740, and an authentication (e.g., a challenge password) to secure shell 172. Control then proceeds to step 2330.

In step 2330, secure shell 172 compares the information with network authority record 240 in database(s) 174. The particular network authority record 240 is identified by network authority ID 242. Secure shell 172 compares, for example, the unique signatures for software 740 with validation checksums 248. Moreover, secure shell 172 compares the private key and an authentication (e.g., a challenge password) provided by network authority 162, as well as comparing the identification keys with key table 244. In addition to secure shell 172 verifying the information sent by network authority 162, secure shell 172 determines a network identifier for network authority 162, e.g. physical address, region, or subnet. Secure shell 172 then compares the network identifier with network ID 246 in database(s) 174. The SSH 172 session ends and control then proceeds to step 2340.

In step 2340, if the comparison of die information determined in step 2330 results in a mismatch, control proceeds to step 2360. Alternatively, where all information is a match, secure shell 172 logs the successful connection of network authority 162 to certificate authority network 180. Control then proceeds to step 2350.

In step 2350, network authority 162 waits for a predetermined delay time, in order for SSH 172 to log the necessary information. CA Firewall 170 then initiates a VPN connection with connects network authority 162 allowing access to certificate authority network 180 and with certificate authority 120. Authentication process 2300 then ends.

In step 2360, due to a discrepancy of information regarding network authority 162, secure shell 172 invalidates network authority 162 in database(s) 174 by deleting network authority record 240 associated with the network authority 162 requesting the session. SSH 172 further invalidates network authority 162 in database(s) 174 and sends an encrypted note to certificate authority 120 indicating a failure and that the offending network authority 162 should not be trusted. Authentication process 2300 then ends.

Figure 19:
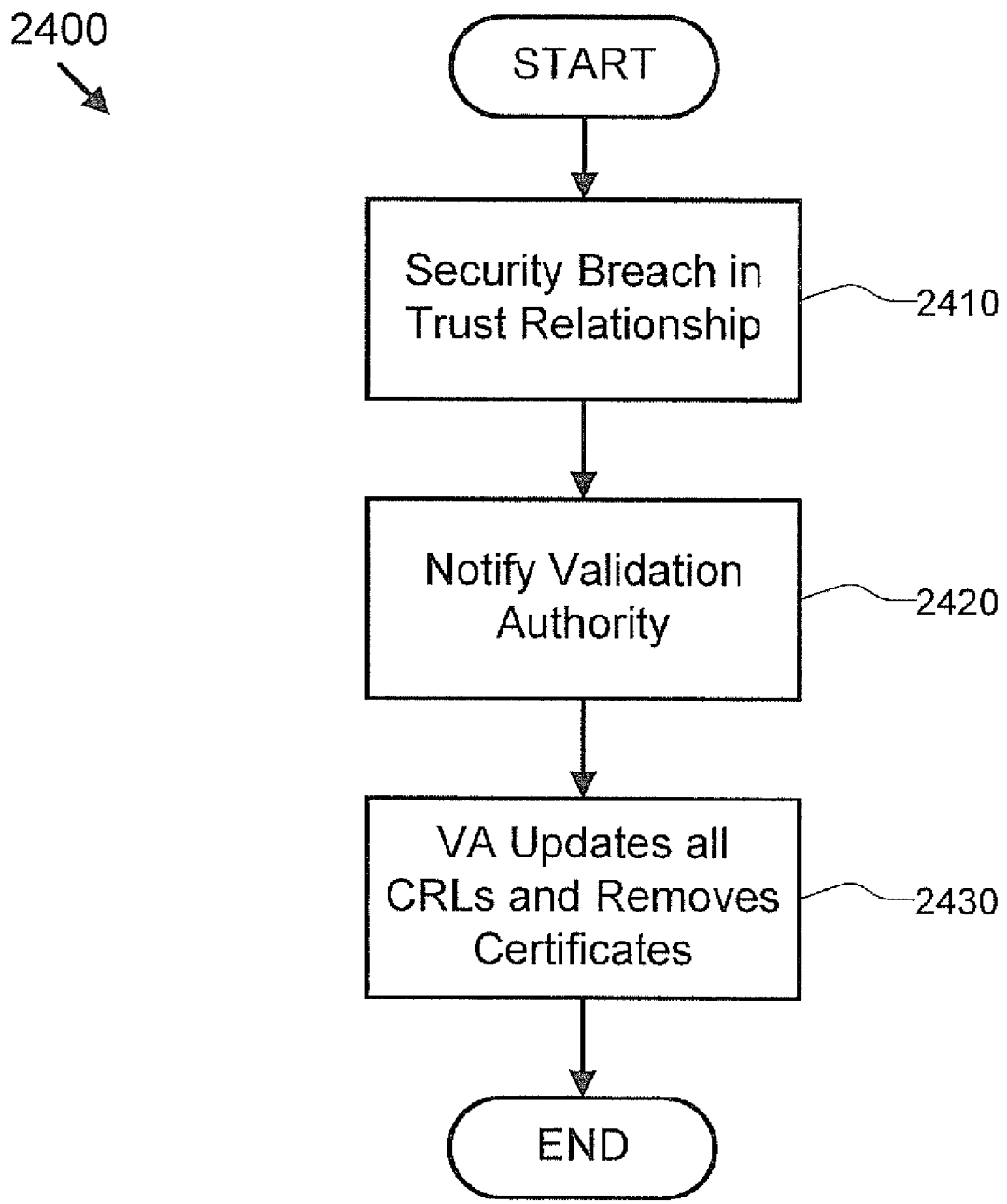
FIG. 19 illustrates a flow diagram of a request for invalidation of a certificate for use with the system of FIG. 6A.

FIG. 19 illustrates a flow diagram of a request for invalidation process 2400 of certificate 50. Invalidation process 2400 begins at step 2410 where user 140 determines a security breach at user machine 198. In this case, user 140 believes that it is possible that private key 36 has been misappropriated. Control then proceeds to step 2420.

At step 2420, the response to the security breach is that user 140 calls a toll-free number and requests invalidation of certificate 50. The toll-free number should be available year round, any time of day. Alternatively, user 140 may request invalidation of certificate 50 through a web-interface or other means. However, for certificate authority 120 to invalidate certificate 50, a high level of evidence is necessary to demonstrate the identity of user 140. Otherwise, an imposter could simply call and invalidate a certificate and would reduce the utility and trust in certificate system 70 and delivery system 150.

In another example, providing private key 36 and certificate 50 through via network 74 would invalidate certificate 50 and private key 36. Validation authority 72 would then infer that because private key 36 is now possessed by a party other than user 140, that private key 36 should be invalidated. In any event, when private key 36 is transmitted, the identity of the transmitter is irrelevant. In yet another example, an agent utilizing identity information from access network connection 152 is able to validate the identity of user 140 simply based on access network connection 152 to central office 164. In that case, certificate 50 may be invalidated without other offerings from user 140 to prove identity. Control then proceeds to step 2430.

At step 2430, local validation authority 176 updates all certificate revocation lists 76, by publishing as described in detail above with respect to FIG. 6A, with an entry that certificate 50 is invalid. Moreover, validation authority 72 removes certificate 50 from certificate storage 90 such that public key 30 is no longer distributed on request from network 74. Once updating of certificate revocation lists 76 and certificate storage 90 is complete, local validation authority 176 publishes the updated certificate revocation list 76 and certificate storage 90 to validation authority 72. Certificate authority 120 also enters the invalidity of certificate 50 in database(s) 174 and the user record associate with certificate 50. In this way, invalid certificates are tracked and reported. Invalidation process 2400 then ends.

Figure 20:
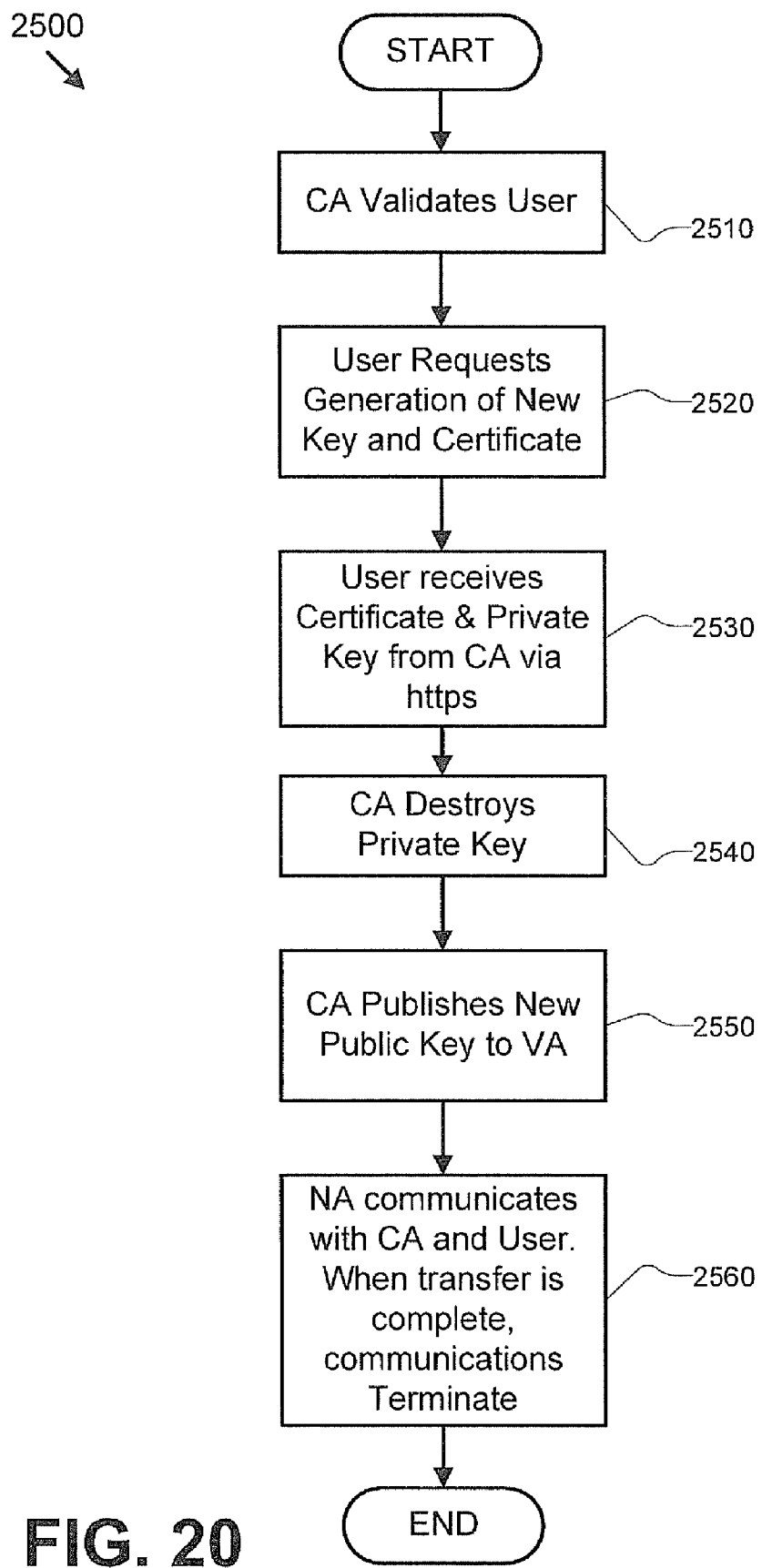
FIG. 20 illustrates a flow diagram of a new certificate issuance process for use with the system of FIG. 6A.

FIG. 20 illustrates a flow diagram of a new certificate issuance process 2500. The process begins at step 2510 where certificate authority 120 validates that user 140 is entitled to a new certificate 50 and new private key 36. Control then proceeds to step 2520.

In step 2520, user 140 requests a new private key 32 and certificate 50 via a secure web page. Certificate authority 120 generates a new private key 36 and the associated public key 30. Next, certificate authority 120 populates a new certificate with user identifier 52, public key 30, validity period 54, certificate revocation list location 56, and trust relationship 100 (see FIG. 2). New public key 30 is then stored in database (s) 174 as a new certificate 50. Control the proceeds to step 2530.

In step 2530, user 140 receives new certificate 50 and private key 36 from certificate authority 120 through network authority 162 using a secure session 810 (e.g., a VPN from network authority 162 to certificate authority network 180) and encrypted communication 820 (e.g., https from user 140 to certificate authority 120). Certificate authority then confirms that transmission was successful and that user 140 is in possession of new certificate 50 and new private key 36. Control then proceeds to step 2540.

In step 2540, certificate authority destroys new private key 36 as final security measure and ensures that only user 140 has possession of new private key 36. Control then proceeds to step 2550.

In step 2550, certificate authority 120 publishes new public key 30 and certificate 50 to local validation authority 176. In response to an update to internal validation authority's 176 certificate storage 90, local validation authority 176 publishes new public key 30 and certificate 50 to validation authority 72. Control then proceeds to step 2560.

In step 2560, certificate authority 120 directs network authority 162 to termination communication with user 140. Communication is terminated and new certificate issuance process 2500 ends.

Network Authority and Identification of User

The reduction in the trust relationship 100, the secure connection provided by network authority 162 from central office 164, as well as the heightened identification of user 140 goes to the public's and user's 140 faith in any public key certificate system 150. Certificate authority 120, in issuing a certificate, must be known to implement a high level of security in the initial identification of user 140 and that the delivery of certificate 50 is performed in a manner that is secure. Thus, the issuance of certificate 50 is known to be delivered to the appropriately identified party, and only to the appropriately identified party.

As shown above, the systems and processes provide for more robust delivery of private key 36, reduced infrastructure costs, an improved trust relationship 100, and direct delivery to user 140. Moreover, because trust relationship 100 is reduced, there is not a lengthy group of trust relationships 100 to check when inquiring about the validity of certificate 50. In essence, trust relationship 100 has been reduced to certificate authority 120 and user 140. As described above, network authority 162 never possesses private key 36. Rather, network authority 162 serves to initiate an encrypted secure communication path (e.g. a SSL) between user 140 and certificate authority network 160. Network authority 162 provides a secure path from central office 164 to certificate authority network 180 which bypasses a typical network path otherwise unavailable to user 140. Additionally, by virtue of network authority 162, user 140 benefits from a secure end-to-end connection from user 140 to certificate authority network 180. Moreover, the systems and methods shown herein are inherently reliable and have improved speed as compared with registration authority systems.

Moreover, as network authority 162 is generally located at central office 164, network authority 162 has the capability of identifying user 140 by physical connection. Thus, when delivering private key 36, certificate authority 120 has a high degree of confidence that only user 140 will receive private key 36. Thus, certificate authority 120 may identify user 140, not only by secret information passed between them (e.g. a symmetrical key), but certificate authority 120 can identify user 140 by connection. Thus, securely delivering a new private key 36 requires a secure connection between certificate authority 120 and user 140.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. For example, although embodiments are described above with reference to access network connection 166, it should be understood that access network connection 166 could be included in embodiments including electrical, optical, and wireless systems and methods. Further, although embodiments used herein disclose use of PON and DSL, it is to be understood that some other standard protocols for implementing a network infrastructure are contemplated. In other embodiments, the identification of user 140 need not be via use of a specific communication line. Identification of a user may be based on a specific unshared communication channel, a shared channel but including a subnet identifier, a geographic identifier, identification of a hardware element in the communication channel to user 140, a receiver identifier (e.g. a media access control ("MAC") address), and other methods.

The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method, comprising:
  receiving, by a certificate authority computing device via a network, a request to provision and provide a private key, said private key being for use with a public and private key system;
  establishing a connection of a requester device to said network for identification, said requester device having made said request via said network;
  verifying, via said connection, the identity of said requester device by a network path utilized by said connection;
  initiating a secure session with the requester device using an intermediate agent on said network, the secure session being initiated between the requester device and a private key provider, wherein said private key provider identifies said intermediate agent before said secure session is initiated and wherein said intermediate agent is configured to perform a self-check by scanning processes of said intermediate agent;
  providing said private key from said certificate authority computing device to said requester device using said secure session; and
  provisioning said private key,
  wherein said intermediate agent is connected to said network at a location that provides the requester device with a connection to said network, said intermediate agent further identifying and authenticating the requester device using the location of the connection to said network of the requester device.

2. The method of claim 1, further comprising routing said secure session via said secure network path.

3. The method of claim 2, further comprising:
  connecting said secure network path to said requester at a first location in said network, said first location being closest to said requester device and where a network routing service is provided by said network.

4. The method of claim 1, further comprising verifying the identity of said requester device by a network address of said requester device.

5. The method of claim 1, wherein said intermediate agent is provided a connection identifier of the requester to identify the requester device.

6. The method of claim 1, further comprising identifying said intermediate agent by:
  establishing a connection between said intermediate agent and a secure shell,
  sending identification information to said secure shell, and
  verifying said intermediate agent based on said identification information.

7. The method of claim 1, wherein the self-check includes a continual scan of at least one of network interfaces, hardware, running process and software to determine if any abnormalities exist and report abnormalities to the certificate authority.

8. The method of claim 1, further comprising reporting any changes in software determined by the self-check to the certificate authority.

9. A system, comprising:
  a first terminal selectively connected to a network;
  a node selectively connected to said network and configured to provision and provide a private key; and
  an intermediate agent positioned between said first terminal and said node;
  a secure connection being initiated between said intermediate agent and said node, said node being configured to validate an identification of said intermediate agent by said connection between said intermediate agent and said node and thereafter provide said private key to said first terminal and provision said private key,
  wherein said intermediate agent is configured to perform a self-check by scanning processes of said intermediate agent,
  wherein said node terminates communication with said intermediate agent in response to determining that at least one of said scanned processes has been compromised, and
  wherein said intermediate agent is connected to said network at a location that provides the first terminal with a connection to said network, said intermediate agent further being configured to identify and authenticate the first terminal using the location of the connection to said network of the first terminal.

10. The system of claim 9, further comprising:
a backbone portion of said network;
a distribution location of said network, said distribution location providing a plurality of terminals with access to said network; and
wherein said first terminal is one of said plurality of terminals.

11. The system of claim 10, wherein said intermediate agent is configured to provide said secure connection.

12. The system of claim 11, wherein said intermediate agent is located at said distribution location, and said intermediate agent connects said first terminal at said distribution location using said secure connection.

13. The system of claim 9, further comprising:
an internal network portion of said network;
an access network portion of said network;
an intermediate agent positioned at a connection between said internal network portion and said access network portion, said first terminal being located at an end of said access network portion opposite said internal network.

14. The system of claim 9, wherein said node is a certificate authority.

15. The system of claim 9, further comprising a plurality of terminals identifiable by a plurality of connections on said network, wherein said node is further configured to selectively provide said private key to one of said plurality of terminals using said plurality of connections.

16. The system of claim 9, further comprising a plurality of terminals having a plurality of unique addresses, each of said terminals being identifiable by one of said unique addresses.

17. A system, comprising:
a distribution location providing access to a network;
a terminal selectively connected to said network via said distribution location;
a dedication fiber connecting said distribution location and said terminal;
a network authority selectively connected to said network and said terminal; and
a certificate authority selectively connected to said network, said certificate authority being configured to provide a private key to said terminal and provision said private key, said network authority being configured to selectively provide a secure session between said network authority and said certificate authority and verify the identity of said terminal by at least said dedication fiber;
wherein said certificate authority identifies said network authority before said secure session is initiated,
wherein said network authority is configured to perform a self-check by scanning processes of said network authority,
wherein said certificate authority terminates communication with said network authority in response to determining that at least one of said scanned processes has been compromised, and
wherein said network authority is connected to said network at a location that provides the terminal with a connection to said network, said network authority further being configured to identify and authenticate the terminal using the location of the connection to said network of the terminal.

18. The system of claim 17, wherein said certificate authority being further configured to provide said private key via said secure session.

19. The system of claim 17, further comprising a validation authority.

20. The system of claim 19, wherein said certificate authority is configured to publish a public key to said validation authority, said public key being derived from said private key.

21. The system of claim 17, further comprising a secure shell connected to said network authority and configured to identify said network authority by:
establishing a connection between said network authority and a secure shell,
sending identification information to said secure shell, and
verifying said network authority based on said identification information.

22. A system, comprising:
a network distribution layer providing access to a network core layer;
a terminal selectively connected to said network distribution layer via a dedication fiber;
a network authority selectively connected to said network distribution layer, said network core layer and said terminal; and
a certificate authority selectively connected to said network authority and configured to verify the identity of said terminal by said dedication fiber and to provide a secure connection to said network authority using said network core layer, said secure connection configured to provide a private key to said terminal responsive to a request to provision and provide said private key,
wherein said certificate authority identifies said network authority before said secure session is initiated,
wherein said network authority is configured to perform a self-check by scanning processes of said network authority,
wherein said certificate authority terminates communication with said network authority in response to determining that at least one of said scanned processes has been compromised, and
wherein said network authority is connected to said network at a location that provides the terminal with a connection to said network, said network authority further being configured to identify and authenticate the terminal using the location of the connection to said network of the terminal.

23. The system of claim 22, wherein said network distribution layer is a central office.

* * * * *